United States Patent [19]
Sato et al.

[11] Patent Number: 5,640,400
[45] Date of Patent: Jun. 17, 1997

[54] MUTUAL CONNECTING APPARATUS BETWEEN NETWORKS

[75] Inventors: Ryoichi Sato; Hirofumi Kita; Kouiti Matuo; Masahiko Tsukamoto, all of Nara; Ikuya Suwa, Tenri; Hideto Naraki, Kita-Katsuragi-gun; Noriyuki Takao; Hidetoshi Takano, both of Toyota, all of Japan

[73] Assignee: Sharp Kabushiki Kaisha, Osaka, Japan

[21] Appl. No.: 607,649

[22] Filed: Feb. 27, 1996

Related U.S. Application Data

[63] Continuation of Ser. No. 237,349, May 3, 1994, abandoned.

[30] Foreign Application Priority Data

May 7, 1993  [JP]  Japan .................... 5-106682

[51] Int. Cl.⁶ .................... H04J 3/02; H04L 15/56
[52] U.S. Cl. .................... 370/401; 370/467; 370/471
[58] Field of Search .................... 370/94.1, 85.13, 370/92, 94.3, 110.1, 85.1, 85.11, 85.14, 85.9, 79, 17; 340/825.5, 825.25, 825.51

[56] References Cited

U.S. PATENT DOCUMENTS

| | | | |
|---|---|---|---|
| 5,182,748 | 1/1993 | Sakata et al. | 370/94.1 |
| 5,251,205 | 10/1993 | Callon et al. | 370/94.1 |
| 5,251,207 | 10/1993 | Abensour et al. | 370/60.1 |
| 5,280,476 | 1/1994 | Kojima et al. | 370/60.1 |
| 5,377,191 | 12/1994 | Farrell et al. | 370/94.1 |

FOREIGN PATENT DOCUMENTS

| | | |
|---|---|---|
| 3-191634 | 8/1991 | Japan . |
| 4-135337 | 5/1992 | Japan . |

*Primary Examiner*—Benedict V. Safourek
*Assistant Examiner*—Ricky Q. Ngo
*Attorney, Agent, or Firm*—David G. Conlin; Brian L. Michaelis

[57] ABSTRACT

A gateway as one example of a mutual connecting apprara- tus between networks virtually provides an address of a mini manufacturing automation protocol (miniMAP) device to a mechatronics network (ME-NET) device in plural devices forming a network so that the miniMAP device uniquely identifies the ME-NET device. These plural devices con- nected to respective networks can mutually transmit and receive data in a network environment in which the ME-NET device is connected to the miniMAP device or another ME-NET device. Conversely, an address of the ME-NET device may be virtually provided to the miniMAP device so that the ME-NET device uniquely identifies the miniMAP device. Further, for example, the plural devices may be constructed by ME-NET devices. In this case, one ME-NET device uniquely identifies another ME-NET device in the plural ME-NET devices by virtually providing a station address unused in this one ME-NET device to this another ME-NET device.

15 Claims, 21 Drawing Sheets

MUTUAL CONNECTING APPARATUS BETWEEN NETWORKS

This application is a continuation of application Ser. No. 08/237,349 filed on May 3, 1994, abandoned.

BACKGROUND OF THE INVENTION

1. Field of the Invention

The present invention relates to a mutual connecting apparatus between networks within a factory in which electric devices such as programmable logic controllers and computers are connected to each other through networks.

2. Description of the Related Art

In general, a mini manufacturing automation protocol (which is called miniMAP in the following description) is a network within a factory developed such that programmable logic controllers, computers, numerical controllers, etc. within the factory are connected to each other through the network and can be operated in cooperation with each other. This protocol is standardized by a public governing system.

A mechatronics network (which is called ME-NET in the following description) is also a network within a factory constructed such that programmable logic controllers, computers, numerical controllers, etc. within the factory are connected to each other through the network. This network is used in many factories, but no protocol of this network is standardized by a public governing system.

The above miniMAP can identify each of connected devices by a Media Access Control address (which is called a MAC address in the following description) of 6 bytes and a Local Service Access Point address (which is called a LSAP address in the following description) of one byte. The above ME-NET can identify each of 64 connected devices at its maximum by a station address of one byte. Recently, various networks within a factory have been used as factory automation (FA) is advanced. Simultaneously, requirements for control of decentralized networks by connecting them together have been also increased.

A plurality of general ME-NETs independently used so far can be controlled by a programmable logic controller in one of these ME-NETs, when the ME-NETs are connected mutually or each of these ME-NETs is connected to a general miniMAP. However, the miniMAP and each of these ME-NETs cannot be mutually connected to each other since address restrictions and systems are respectively different from each other. Namely, the address systems of the above general miniMAP and ME-NET are greatly different from each other so that no connected device can be uniquely identified. Therefore, it is impossible to transmit and receive data between the miniMAP and the ME-NET by mutual connection.

SUMMARY OF THE INVENTION

It is therefore an object of the present invention to provide a mutual connecting apparatus between networks in which a connected device can be uniquely identified between constructional devices of networks having different address systems and data can be transmitted and received between the constructional devices by mutual connection thereof.

In accordance with a first construction of the present invention, the above object can be achieved by a mutual connecting apparatus between networks characterized in that a specified address of an identifying device is virtually provided to an identified device in plural devices forming a network so that the identifying device uniquely identifies the identified device.

In accordance with a second construction of the present invention, the identifying device is a mini manufacturing automation protocol device (which is called a miniMAP device in the following description); the identified device is a mechatronics network device (which is called a ME-NET device in the following description); the specified address is a media access control address (which is called a MAC address in the following description) of the miniMAP; and the miniMAP device uniquely identifies the ME-NET device by virtually providing the MAC address to the ME-NET device.

In accordance with a third construction of the present invention, the identifying device is a ME-NET device; the identified device is a miniMAP device; the specified address is a station address of the ME-NET; and the ME-NET device uniquely identifies the miniMAP device by virtually providing the station address to the miniMAP device.

In accordance with a fourth construction of the present invention, the plural devices are ME-NET devices; the specified address is a station address; and one ME-NET device uniquely identifies another ME-NET device in the plural ME-NET devices by virtually providing a station address unused in this one ME-NET device to this another ME-NET device.

In accordance with a fifth construction of the present invention, the plural devices forming the network are constructed by at least two network devices of different kinds; the connecting apparatus has a built-in table for making an original address of one network device correspond to a virtual address of this one network device seen from another network device; and an address of a data frame is converted by using the built-in table from an address in a data transmitting side network to an address in a data receiving side network when the data frame is relayed from the one network to the another network.

In accordance with a sixth construction of the present invention, the miniMAP device uniquely identifies a network connected to the ME-NET device by designating a MAC address of the connecting apparatus connecting the mutual networks as a value of a destination address (DA) of a miniMAP data frame transmitted to the connecting apparatus from the miniMAP device and a value of a source address (SA) of the miniMAP data frame transmitted from the connecting apparatus to the miniMAP device.

In accordance with a seventh construction of the present invention, the miniMAP device uniquely identifies the ME-NET device by designating a station address; the station address is additionally provided to the ME-NET device as a value of a destination service access point address (which is called a DSAP address in the following description) of a miniMAP data frame transmitted from the miniMAP device to the connecting apparatus when data are transmitted from the miniMAP device to the ME-NET device; and the station address is also additionally provided to the ME-NET device as a value of a source service access point address (which is called a SSAP address in the following description) of the miniMAP data frame transmitted from the connecting apparatus to the miniMAP device when data are transmitted from the ME-NET device to the miniMAP device.

In accordance with an eighth construction of the present invention, the ME-NET device uniquely identifies the miniMAP device by storing an address of the miniMAP to a data region for option commands by using the option commands in a ME-NET data frame used between the ME-NET device and the connecting apparatus when data are exchanged between the ME-NET device and the miniMAP device.

In accordance with a ninth construction of the present invention, when a miniMAP data frame generated by the miniMAP device reaches the connecting apparatus and protocol conversion is performed from the miniMAP data frame to the ME-NET data frame, a value of a DSAP address of the mini manufacturing automation protocol data frame is substituted into a destination address (DA) of the ME-NET data frame, a station address of the connecting apparatus is substituted into a source address (SA) of the ME-NET data frame, values of a source address (SA) and a SSAP address of the miniMAP data frame are substituted into the data region for the option commands of the ME-NET data frame, and data are transmitted from the miniMAP device to the ME-NET device through the connecting apparatus.

In accordance with a tenth construction of the present invention, when a miniMAP data frame generated by the miniMAP device reaches the connecting apparatus and protocol conversion is performed from the miniMAP data frame to the ME-NET data frame, a value of a DSAP address of the miniMAP data frame is substituted into a destination address (DA) of the ME-NET data frame, a station address of the connecting apparatus is substituted into a source address (SA) of the ME-NET data frame, values of a source address (SA), a SSAP address and the DSAP address of the miniMAP data frame are registered to an internal table of the connecting apparatus, and data are transmitted from the miniMAP device to the ME-NET device through the connecting apparatus.

In accordance with an eleventh construction of the present invention, when the ME-NET data frame generated by the ME-NET device reaches the connecting apparatus and protocol conversion is performed from the ME-NET data frame to the miniMAP data frame, the connecting apparatus searches a station address conforming to a value of the source address (SA) of the ME-NET data frame from the internal table, a MAC address of the internal table is substituted into a destination address (DA) of the miniMAP data frame, the MAC address of the connecting apparatus is substituted into the source address (SA) of the miniMAP data frame, a local service access point address (LSAP address) of the internal table is substituted into the DSAP address of the miniMAP data frame, a value of the source address (SA) of the ME-NET data frame is substituted into the SSAP address of the miniMAP data frame, and responsive data responding to the transmitted data are transmitted from the ME-NET device to the miniMAP device through the connecting apparatus.

In accordance with a twelfth construction of the present invention, when the ME-NET data frame generated by the ME-NET device reaches the connecting apparatus and protocol conversion is performed from the ME-NET data frame to the miniMAP data frame, a MAC address in the data region for the option commands of the ME-NET data frame is substituted into a destination address (DA) of the miniMAP data frame, a MAC address of the connecting apparatus is substituted into the source address (SA) of the miniMAP data frame, a local service access point address (LSAP address) in the data region for the option commands of the ME-NET data frame is substituted into the DSAP address of the miniMAP data frame, a value of the source address (SA) of the ME-NET data frame is substituted into the SSAP address of the miniMAP data frame, and responsive data responding to the transmitted data are transmitted from the ME-NET device to the miniMAP device through the connecting apparatus.

As mentioned above, in accordance with the first construction of the mutual connecting apparatus between networks of the present invention, a specified address of an identifying device is virtually provided to an identified device in plural devices forming a network so that the identifying device uniquely identifies the identified device. Accordingly, data can be mutually transmitted and received between one network device and another network device by using virtual addresses.

In accordance with the second construction of the present invention, the identifying device is a mini manufacturing automation protocol device (which is called a miniMAP device in the following description); the identified device is a mechatronics network device (which is called a ME-NET device in the following description); the specified address is a media access control address (which is called a MAC address in the following description) of the miniMAP; and the miniMAP device uniquely identifies the ME-NET device by virtually providing the MAC address to the ME-NET device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the third construction of the present invention, the identifying device is a ME-NET device; the identified device is a miniMAP device; the specified address is a station address of the ME-NET; and the ME-NET device uniquely identifies the miniMAP device by virtually providing the station address to the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the fourth construction of the present invention, the plural devices are ME-NET devices; the specified address is a station address; and one ME-NET device uniquely identifies another NET device in the plural ME-NET devices by virtually providing a station address unused in this one ME-NET device to this another ME-NET device. Accordingly, data can be mutually transmitted and received between the ME-NET devices connected through a network by connecting the ME-NET devices to each other through the mutual connecting apparatus and mutually using virtual addresses.

In accordance with the fifth construction of the present invention, the plural devices forming the network are constructed by at least two network devices of different kinds; the connecting apparatus has a built-in table for making an original address of one network device correspond to a virtual address of this one network device seen from another network device; and an address of a data frame is converted by using the built-in table from an address in a data transmitting side network to an address in a data receiving side network when the data frame is relayed from the one network to the another network. Accordingly, data can be mutually transmitted and received between the one and another network devices connected through a network by connecting these network devices to each other through the mutual connecting apparatus and mutually using virtual addresses.

In accordance with the sixth construction of the present invention, the miniMAP device uniquely identifies a network connected to the ME-NET device by designating a MAC address of the connecting apparatus connecting the mutual networks as a value of a destination address (DA) of a miniMAP data frame transmitted to the connecting apparatus from the miniMAP device and a value of a source address (SA) of the miniMAP data frame transmitted from the connecting apparatus to the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the seventh construction of the present invention, the miniMAP device uniquely identifies the ME-NET device by designating a station address; the station address is additionally provided to the ME-NET device as a value of a destination service access point address (which is called a DSAP address in the following description) of a miniMAP data frame transmitted from the miniMAP device to the connecting apparatus when data are transmitted from the miniMAP device to the ME-NET device; and the station address is also additionally provided to the ME-NET device as a value of a source service access point address (which is called a SSAP address in the following description) of the miniMAP data frame transmitted from the connecting apparatus to the miniMAP device when data are transmitted from the ME-NET device to the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the eighth construction of the present invention, the ME-NET device uniquely identifies the miniMAP device by storing an address of the miniMAP to a data region for option commands by using the option commands in a ME-NET data frame used between the ME-NET device and the connecting apparatus when data are exchanged between the ME-NET device and the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the ninth construction of the present invention, when a miniMAP data frame generated by the miniMAP device reaches the connecting apparatus and protocol conversion is performed from the miniMAP data frame to the ME-NET data frame, a value of a DSAP address of the mini manufacturing automation protocol data frame is substituted into a destination address (DA) of the ME-NET data frame, a station address of the connecting apparatus is substituted into a source address (SA) of the ME-NET data frame, values of a source address (SA) and a SSAP address of the miniMAP data frame are substituted into the data region for the option commands of the ME-NET data frame, and data are transmitted from the miniMAP device to the ME-NET device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the tenth construction of the present invention, when a miniMAP data frame generated by the miniMAP device reaches the connecting apparatus and protocol conversion is performed from the miniMAP data frame to the ME-NET data frame, a value of a DSAP address of the miniMAP data frame is substituted into a destination address (DA) of the ME-NET data frame, a station address of the connecting apparatus is substituted into a source address (SA) of the ME-NET data frame, values of a source address (SA), a SSAP address and the DSAP address of the miniMAP data frame are registered to an internal table of the connecting apparatus, and data are transmitted from the miniMAP device to the ME-NET device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the eleventh construction of the present invention, when the ME-NET data frame generated by the ME-NET device reaches the connecting apparatus and protocol conversion is performed from the ME-NET data frame to the miniMAP data frame, the connecting apparatus searches a station address conforming to a value of the source address (SA) of the ME-NET data frame from the internal table, a MAC address of the internal table is substituted into a destination address (DA) of the miniMAP data frame, the MAC address of the connecting apparatus is substituted into the source address (SA) of the miniMAP data frame, a local service access point address (LSAP address) of the internal table is substituted into the DSAP address of the miniMAP data frame, a value of the source address (SA) of the ME-NET data frame is substituted into the SSAP address of the miniMAP data frame, and responsive data responding to the transmitted data are transmitted from the ME-NET device to the miniMAP device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with the twelfth construction of the present invention, when the ME-NET data frame generated by the ME-NET device reaches the connecting apparatus and protocol conversion is performed from the ME-NET data frame to the miniMAP data frame, a MAC address in the data region for the option commands of the ME-NET data frame is substituted into a destination address (DA) of the miniMAP data frame, a MAC address of the connecting apparatus is substituted into the source address (SA) of the miniMAP data frame, a local service access point address (LSAP address) in the data region for the option commands of the ME-NET data frame is substituted into the DSAP address of the miniMAP data frame, a value of the source address (SA) of the ME-NET data frame is substituted into the SSAP address of the miniMAP data frame, and responsive data responding to the transmitted data are transmitted from the ME-NET device to the miniMAP device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a mutual connecting apparatus between networks in the present invention will next be described in detail with reference to the accompanying drawings.

Figure 1:
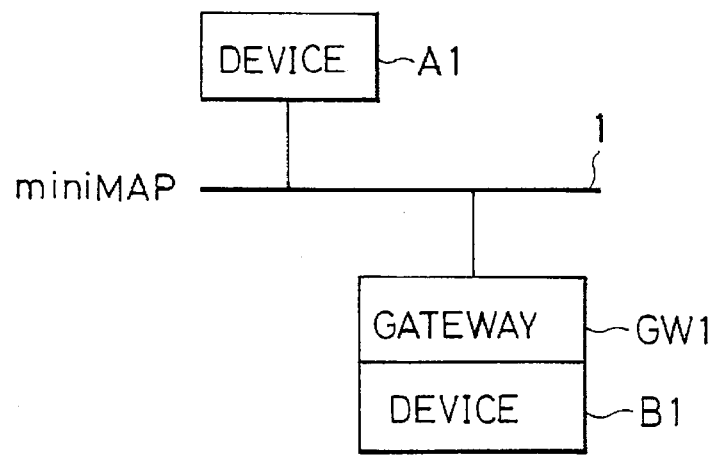
FIG. 1 s a block diagram showing the construction of a mutual connecting apparatus between networks in accordance with a first embodiment of the present invention.

FIG. 1 is a block diagram showing the construction of a mutual connecting apparatus between networks in accordance with a first embodiment of the present invention. Addresses of network devices A1 and B1 shown in FIG. 1 are respectively shown in the following Table 1.

TABLE 1

| device name | MAC address |
| --- | --- |
| A | 00000000000A |
| B | *00000000000B* |

As shown in the above Table 1, notation of these addresses is provided by hexadecimal notation. Virtual addresses are shown by italic characters.

The network device A1 is a miniMAP (mini Manufacturing Automation Protocol) device and is uniquely identified by a Media Access Control (MAC) address "00000000000A" of 6 bytes.

The network device B1 is a ME-NET (Mechatronics Network) device and is connected to the miniMAP device A1 through a gateway GW1.

The ME-NET device B1 has a station address of one byte as an original address. A value of this station address is set to one of 64 values from 01 to 40 by the hexadecimal notation. It is not preferable to use this station address value as the MAC address of the miniMAP device since there is a possibility that this station address value overlaps an address value of another network device. Therefore, a virtual MAC address "00000000000B" able to be uniquely identified is provided to the ME-NET device B1 by using the mutual connecting apparatus between networks of the present invention so that the ME-NET device B1 can be connected to the miniMAP device A1 through the gateway As a result, the miniMAP device A1 can identify the ME-NET device B1 by the NIAC address "00000000000B".

Figure 2:
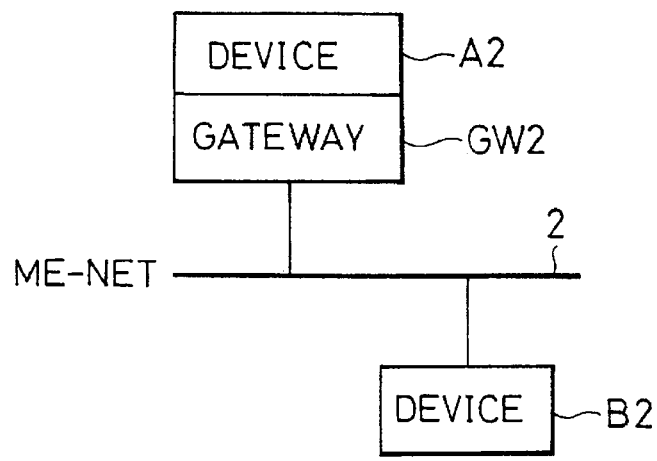
FIG. 2 is a block diagram showing the construction of a mutual connecting apparatus between networks in accordance with a second embodiment of the present invention.

FIG. 2 is a block diagram showing the construction of a mutual connecting apparatus between networks in accordance with a second embodiment of the present invention.

Addresses of network devices A2 and B2 are respectively shown in the following Table 2.

TABLE 2

| device name | station address |
| --- | --- |
| A | *11* |
| B | 01 |

As shown in the above Table 2, notation of these addresses is provided by hexadecimal notation. Virtual addresses are shown by italic characters.

The network device B2 is a ME-NET (Mechatronics Network) device and is uniquely identified by a station address "01" of one byte.

The network device A2 is a miniMAP (mini Manufacturing Automation Protocol) device and is connected to the ME-NET device B2 through a gateway GW2.

The miniMAP device A2 has a MAC address of six bytes as an original address. However, the ME-NET device B2 uses a station address of one byte. Therefore, no MAC address of the miniMAP device A2 can be used in the ME-NET device B2 as it is. Therefore, an unused station address "11" is provided to the miniMAP device A2 by using the mutual connecting apparatus between networks of the present invention so that the miniMAP device A2 can be connected to the ME-NET device B2 through the gateway GW2.

As a result, the ME-NET device B2 can identify the miniMAP device A2 by the station address "11".

Figure 3:
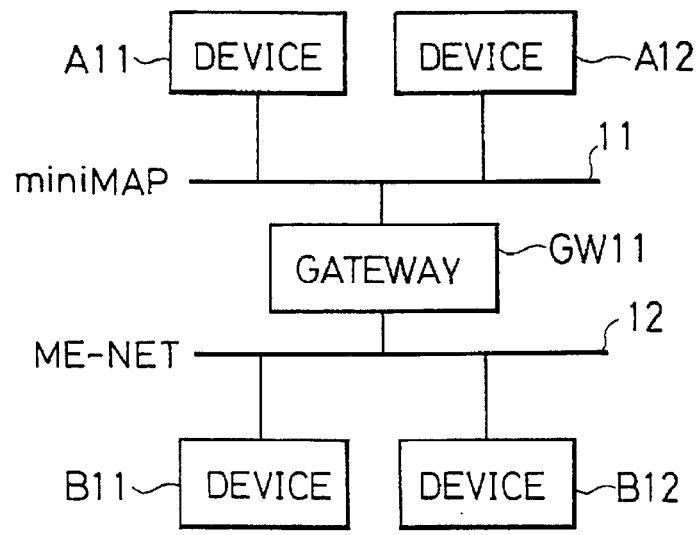
FIG. 3 is a block diagram showing the construction of a mutual connecting apparatus between networks in accordance with a third embodiment of the present invention.

FIG. 3 is a block diagram showing the construction of a mutual connecting apparatus between networks in accordance with a third embodiment of the present invention.

In each of the above first and second embodiments shown in FIGS. 1 and 2, the gateway is directly added to a device requiring protocol conversion. However, in this case, it is necessary to arrange gateways by the number of devices each requiring the protocol conversion.

As shown in FIG. 3, plural miniMAP devices such as A11 and A12 can be connected to plural ME-NET devices such as B11 and B12 through only one gateway GW11. In this case, all the devices must be uniquely designated in address systems of both the networks to mutually transmit and receive data between the connected devices A11, A12 and the connected devices B11, B12.

As shown in the following Table 4, virtual MAC addresses are provided to the ME-NET devices B11 and B12 to identify the ME-NET devices B11 and B12 by the miniMAP devices A11 and A12.

TABLE 4

| device name | station address | MAC address (virtual address) |
| --- | --- | --- |
| B1 | 01 | *0000000000B1* |
| B2 | 02 | *0000000000B2* |

Address notation in the above Table 4 is provided by hexadecimal notation. The virtual addresses are shown by italic characters. Namely, the ME-NET device B11 is identified by a virtual MAC address "0000000000B1" and the ME-NET device B12 is identified by a virtual NIAC address "0000000000B2".

Conversely, as shown in the following Table 3, virtual station addresses are provided to the miniMAP devices A11 and A12 to identify the miniMAP devices A11 and A12 by the ME-NET devices B11 and B12.

TABLE 3

| device name | MAC address | station address (virtual address) |
| --- | --- | --- |
| A1 | 0000000000A1 | *11* |
| A2 | 0000000000A2 | *12* |

Address notation in the above Table 3 is provided by hexadecimal notation. The virtual addresses are shown by italic characters. Namely, the miniMAP device A11 is identified by a virtual station address "11" and the miniMAP device A12 is identified by a virtual station address "12".

Figure 4:
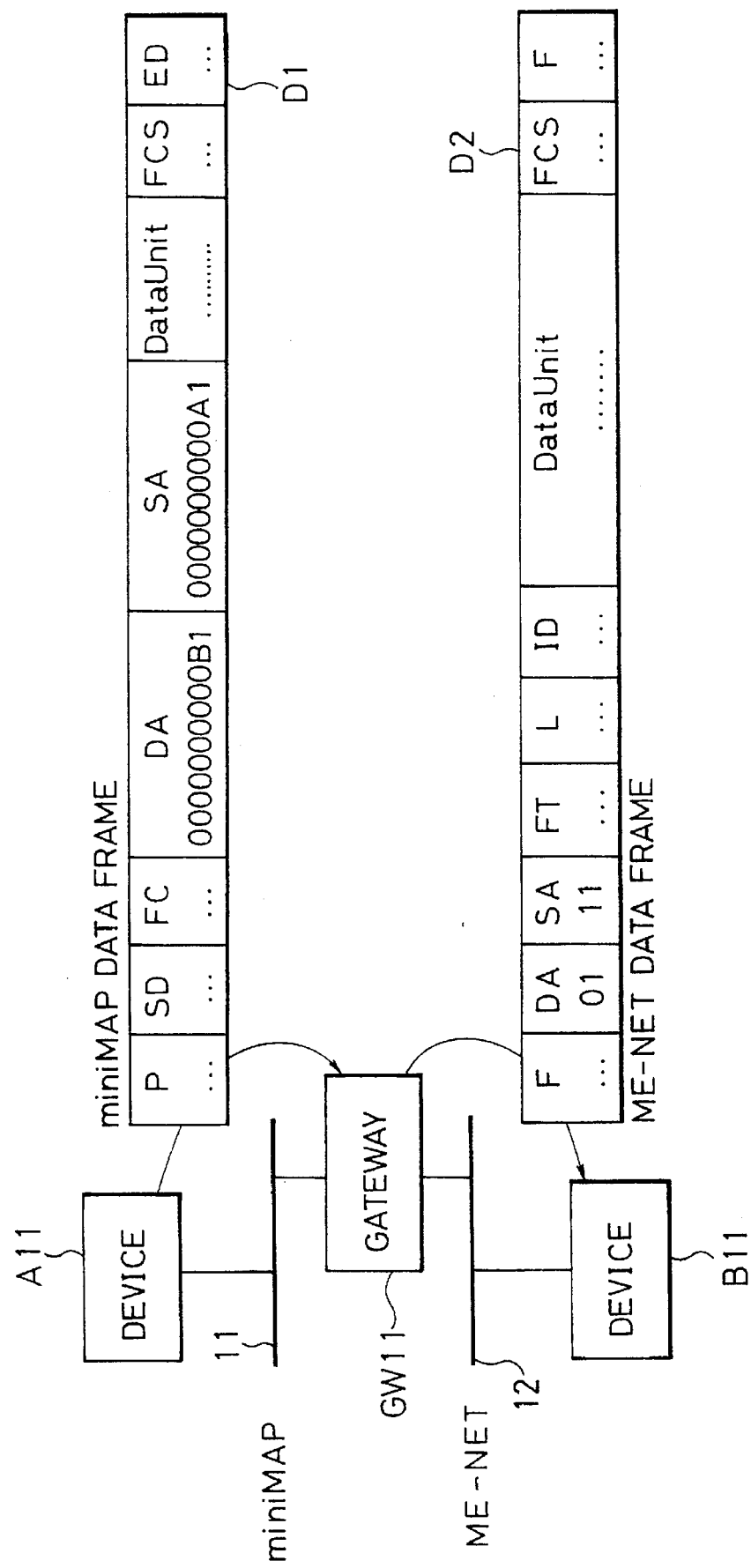
FIG. 4 s a block diagram showing the construction of a mutual connecting apparatus between networks in accordance with a fourth embodiment of the present invention.
Figure 5:
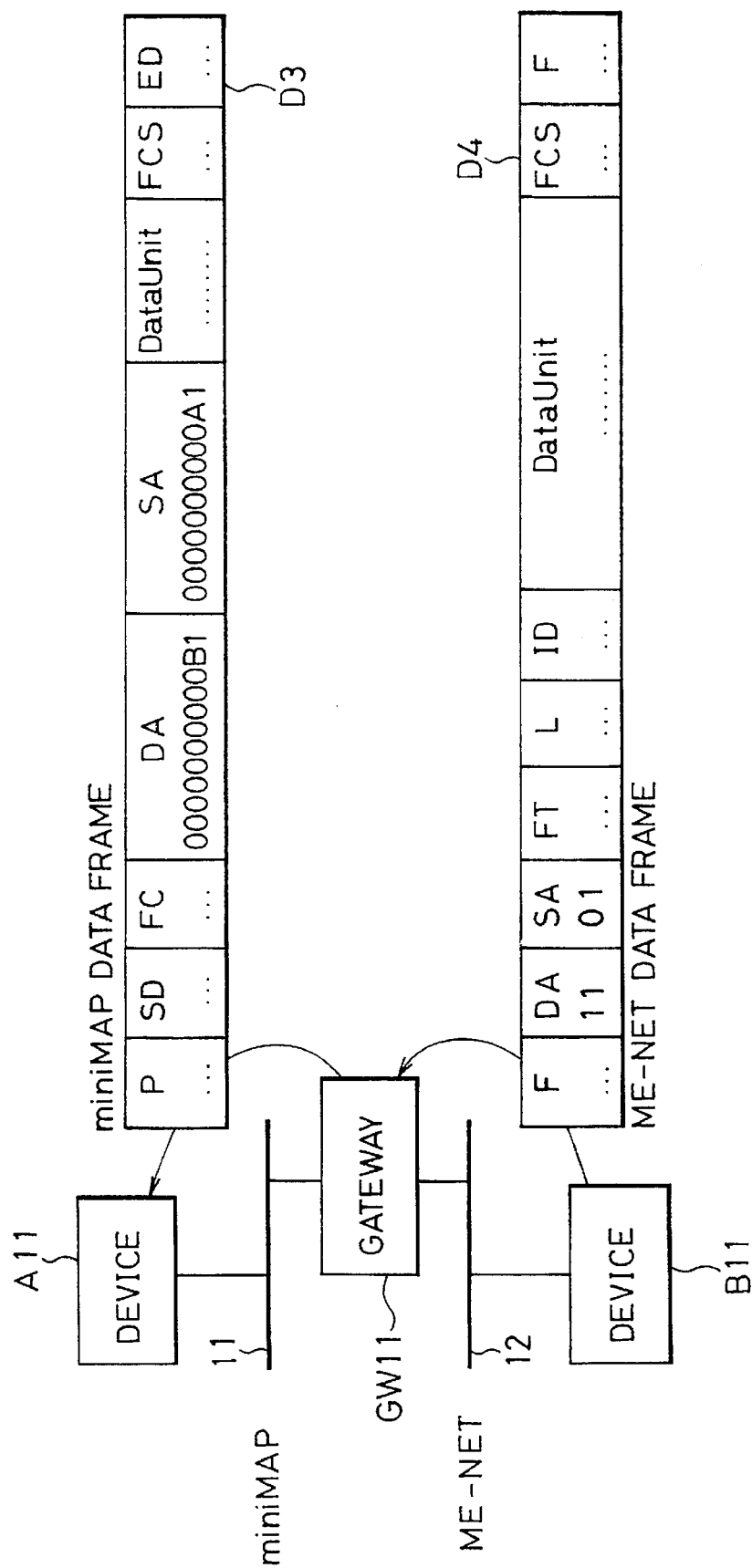
FIG. 5 is a block diagram showing the construction of a mutual connecting apparatus between networks in accordance with a fifth embodiment of the present invention.

FIGS. 4 and 5 are block diagrams respectively showing the construction of a mutual connecting apparatus between networks in accordance with fourth and fifth embodiments of the present invention.

Figure 10:
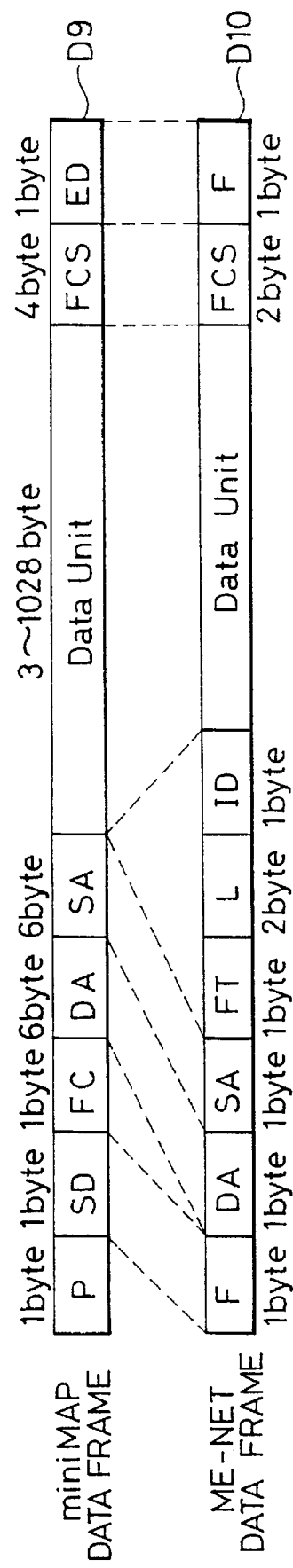
FIG. 10 is a view for explaining structures of the ME-NET data frame and the miniMAP data frame used in the mutual connecting apparatus between networks of the present invention.

FIG. 4 shows a case in which a miniMAP device A11 transmits data to a ME-NET device B11. FIG. 5 shows a case in which a ME-NET device B11 transmits data to a miniMAP device A11. These data are transmitted by a data frame as shown in FIG. 10. In FIG. 10, reference numerals P, SD, ED and F respectively designate a preamble, a starting delimiter, an ending delimiter and a starting/ending flag. Reference numerals FC, FT, DA and SA respectively designate frame control, a frame type, a destination address as a data receiving address (MAC/station number) and a source address as a data sending address (MAC/station number). Reference numerals L, ID and FCS respectively designate a frame length, an LLC frame identifier and a frame check sequence.

As shown in FIG. 10, the data frame includes data transmitted and received between the miniMAP and ME-NET devices. Further, the data frame includes a destination address DA indicative of a data receiving address, a source address SA indicative of a data sending address, a starting delimiter SD and an ending delimiter ED respectively indicating start and end of data transmission, a starting/ending flag F, etc.

In FIG. 4, the miniMAP A11 generates and transmits a data frame of miniMAP. An image of the miniMAP data frame is shown by reference numeral D1 in FIG. 4.

The destination address DA indicative of a data receiving address is set to a virtual MAC address "0000000000B1" of the ME-NET device B11. The source address SA indicative of a data sending address is set to an original MAC address "0000000000A1" of the miniMAP device A11.

In a gateway GW11, information shown in the above Tables 3 and 4 is set as an internal table before this information is processed. When the gateway GW11 receives the data frame, the gateway GW11 processes the data frame with reference to the internal table in accordance with a flow chart shown in FIG. 11.

Figure 11:
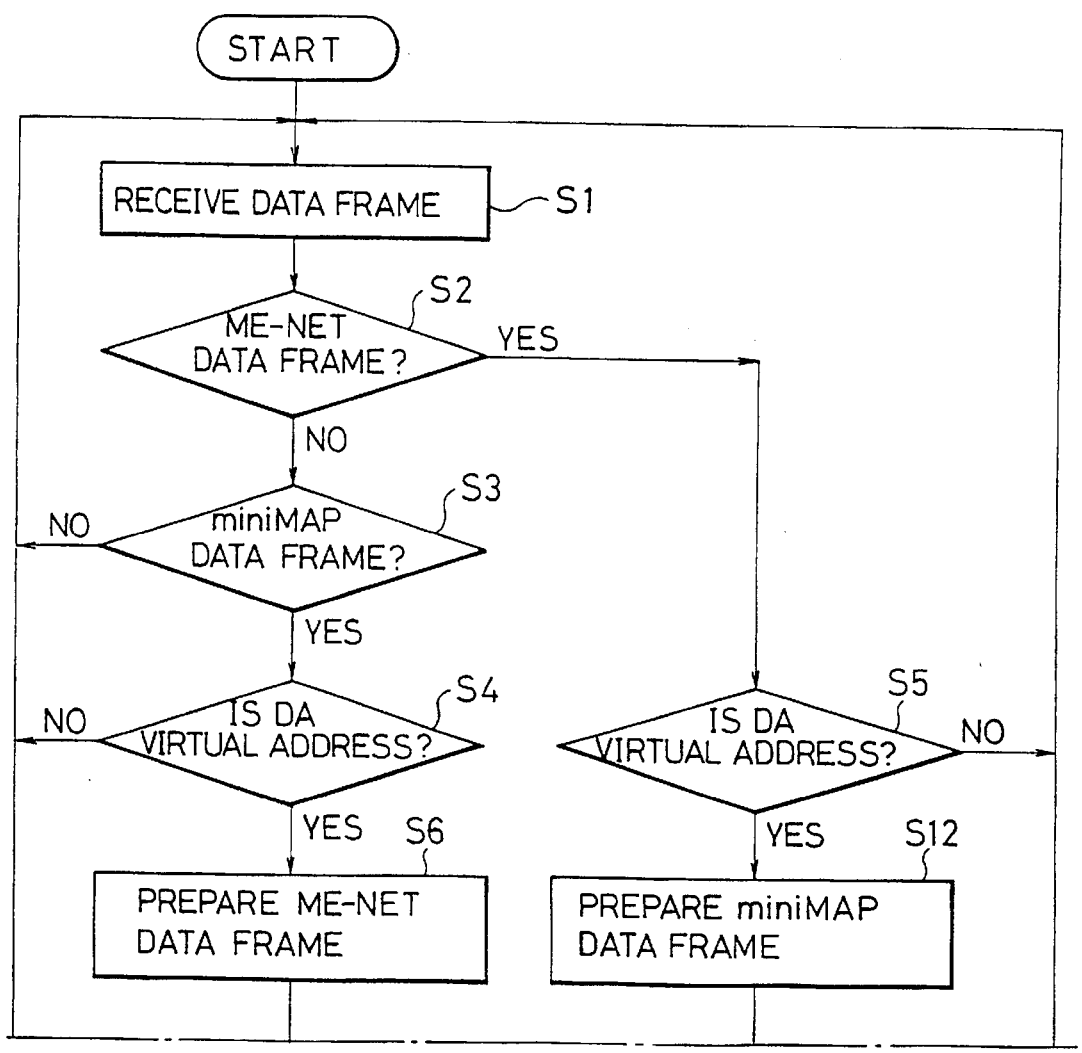
FIG. 11 is a flow chart for explaining an operation of the mutual connecting apparatus between networks of the present invention in a network environment in which ME-NET and miniMAP devices are connected to each other, in which FIG. 11 comprises FIG. 11(a) and FIG. 11(b)
Figure 11B:
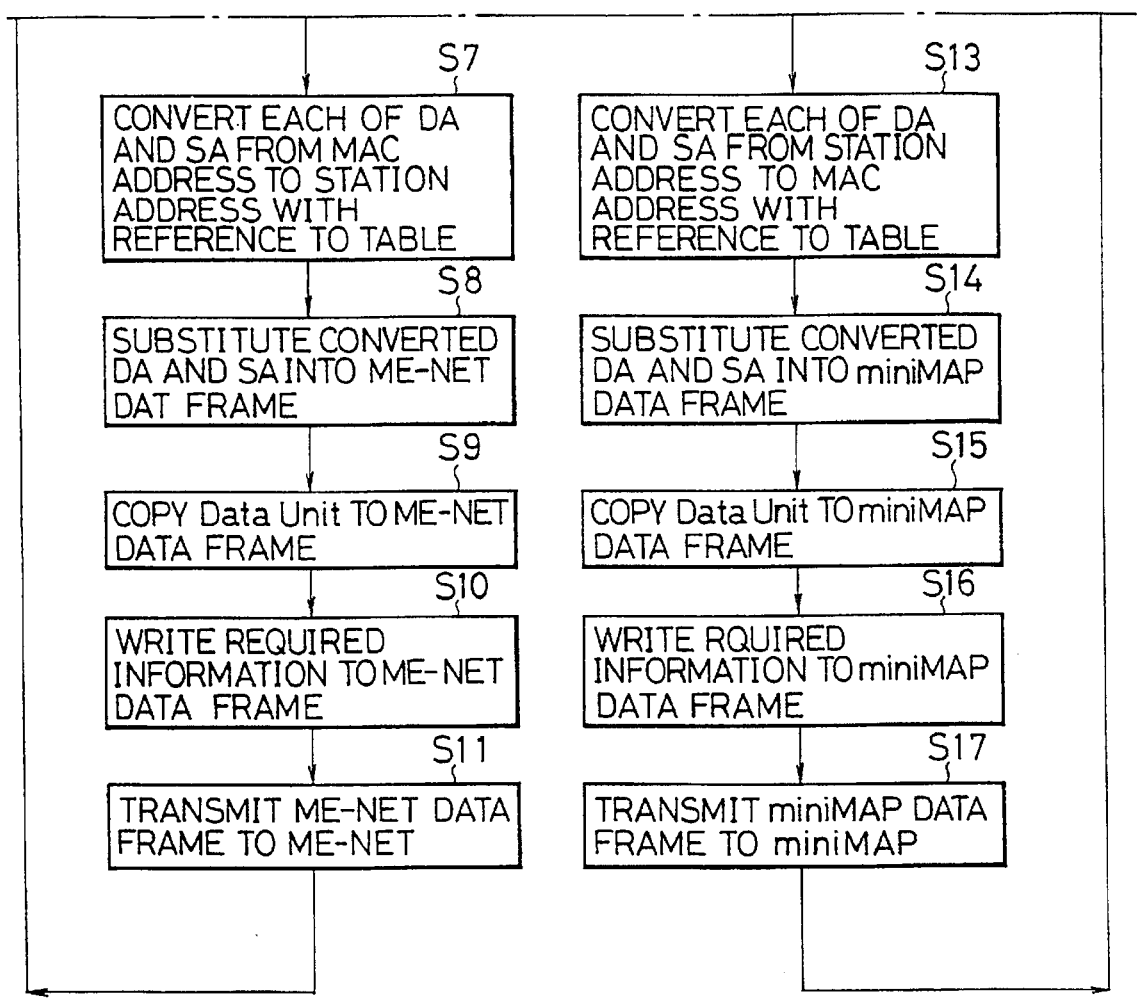

A processing operation of the mutual connecting apparatus between networks in each of the fourth and fifth embodiments shown in FIGS. 4 and 5 will next be explained with reference to the flow chart of FIG. 11.

First, the gateway GW11 receives a data frame in a step S1. The gateway GW11 then judges in steps S2 and S3 whether the received data frame is a ME-NET or miniMAP data frame. Further, the gateway GW11 judges in steps S4 and S5 whether a destination address DA is a virtual address or not.

In the fourth embodiment shown in FIG. 4, the data frame is set to the miniMAP frame. Accordingly, it is judged from the Table 4 that the destination address DA is a virtual address. Therefore, it proceeds to a step S6 in which the gateway GW11 prepares an empty ME-NET data frame. In a step S7, the destination address DA and a source address SA of the miniMAP data frame are respectively converted from MAC addresses to station addresses by using the Tables 4 and 3.

In a step S8, the converted addresses are respectively substituted into a destination address DA and a source address SA of the prepared ME-NET data frame. In a step S9, a data unit portion is copied or converted in a required way and is substituted into the ME-NET data frame. In a step S10, other required information is written to the ME-NET data frame so that the ME-NET data frame is completely made. This completed ME-NET data frame is transmitted to the ME-NET device in a step S11. An image of this ME-NET data frame is shown by reference numeral D2 in FIG. 4.

As shown this frame image D2 in FIG. 4, the destination address DA indicative of a data receiving address is converted to a station address "01" of the ME-NET device B11. The source address SA indicative of a data sending address is converted to a virtual station address "11" of the miniMAP device A11. As a result, the ME-NET data frame is correctly received by the ME-NET device B11.

In FIG. 5, the ME-NET device B11 generates and transmits a ME-NET data frame. An image of the ME-NET data frame is shown by reference numeral D4 in FIG. 5. A destination address DA indicative of a data receiving address is set to a virtual station address "11" of the miniMAP device A11. A source address SA indicative of a data sending address is set to an original station address "01" of the ME-NET device B11.

In a gateway GW11, information shown in the above Tables 3 and 4 is set as an internal table before this information is processed. When the gateway GW11 receives the data frame, the gateway GW11 processes the data frame with reference to the internal table in accordance with a flow chart shown in FIG. 11. The processing operation of a network connecting system shown in FIG. 5 will next be again explained with reference to the flow chart of FIG. 11.

First, the gateway GW11 receives a data frame in a step S1. The gateway GW11 then judges in steps S2 and S3 whether the received data frame is a ME-NET or miniMAP data frame. Further, the gateway GW11 judges in steps S4 and S5 whether a destination address DA is a virtual address or not. In FIG. 5, the data frame is set to the ME-NET frame. Accordingly, it is judged from the Table 3 that the destination address DA is a virtual address. Therefore, it proceeds to a step S12 in which the gateway GW11 prepares an empty miniMAP data frame. In a step S13, the destination address DA and a source address SA of the ME-NET data frame are respectively converted from station addresses to MAC addresses by using the above Tables 3 and 4.

In a step S14, the converted addresses are respectively substituted into a destination address DA and a source address SA of the prepared miniMAP data frame. In a step S15, a data unit portion is copied or converted in a required way and is substituted into the miniMAP data frame. In a step S16, other required information is written to the miniMAP data frame so that the miniMAP data frame is completely made. This completed miniMAP data frame is transmitted to the miniMAP device in a step S17.

An image of this miniMAP data frame is shown by reference numeral D3 in FIG. 5. In FIG. 5, the destination address DA indicative of a data receiving address is converted to a MAC address "0000000000A1" of the miniMAP device A11. The source address SA indicative of a data sending address is converted to a virtual MAC address "0000000000B1" of the ME-NET device B11.

As a result, the miniMAP data frame is correctly received by the miniMAP device A11.

Figure 6:
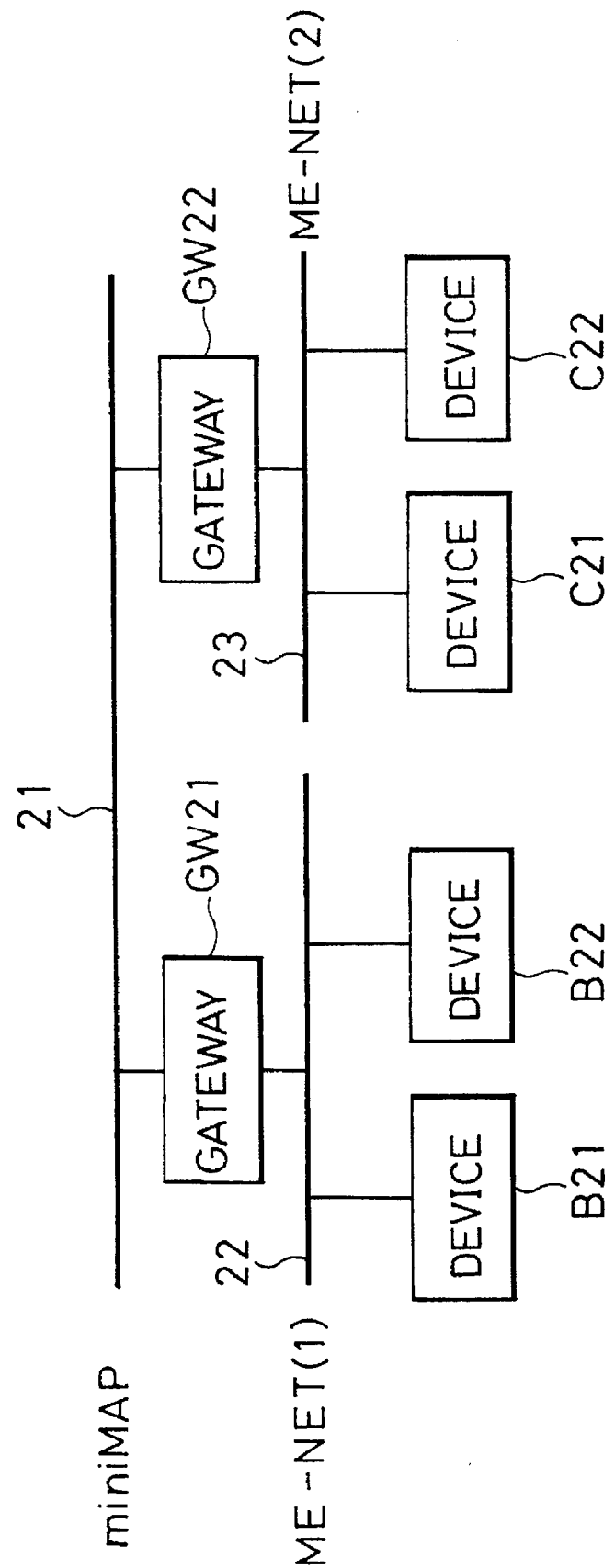
FIG. 6 is a block diagram showing the construction of a mutual connecting apparatus between networks in accordance with a sixth embodiment of the present invention.

FIG. 6 is a block diagram showing the construction of a mutual connecting apparatus between networks in accordance with a sixth embodiment of the present invention.

In FIG. 6, ME-NET(1) and ME-NET(2) devices are respectively connected to a miniMAP device through gateways GW21 and GW22. As a result, the ME-NET(1) and ME-NET(2) devices are connected to each other through the miniMAP device. ME-NET(1) devices B21, B22 and ME-NET(2) devices C21, C22 must be uniquely designated in address systems of both the networks to mutually transmit and receive data between these ME-NET devices.

As shown in the following Table 5, virtual station addresses are provided to the ME-NET(2) devices C21 and C22 to identify these ME-NET(2) devices C21 and C22 by the ME-NET(1) devices B21 and B22.

TABLE 5

| device name | station address |
|---|---|
| B1 | 01 |
| B2 | 02 |
| C1 | *21* |
| C2 | *22* |

Address notation in the above Table 5 is provided by hexadecimal notation. The virtual station addresses are shown by italic characters. Namely, the ME-NET device C21 is identified by a virtual station address "21" and the ME-NET device C22 is identified by a virtual station address "22".

Conversely, as shown in the following Table 6, virtual station addresses are provided to the ME-NET(1) devices B21 and B22 to identify these ME-NET(1) devices B21 and B22 by the ME-NET(2) devices C21 and C22.

TABLE 6

| device name | station address |
|---|---|
| C1 | 01 |
| C2 | 02 |
| B1 | *31* |
| B2 | *32* |

Address notation in the above Table 6 is provided by hexadecimal notation. The virtual station addresses are shown by italic characters. Namely, the ME-NET device B21 is identified by a virtual station address "31" and the ME-NET device B22 is identified by a virtual station address "32".

Information shown in the above Tables 5 and 6 is set to the gateways GW21 and GW22 as an internal table before this information is processed.

The following Table 7 shows a combination of the Tables 5 and 6 as one example of the information of the gateways GW21 and GW22 as an internal table.

TABLE 7

| device name | station address of ME-NET(1) | station address of ME-NET(2) |
| --- | --- | --- |
| B1 | 01 | *31* |
| B2 | 02 | *32* |
| C1 | *21* | 01 |
| C2 | *22* | 02 |

Data are transmitted and received between the ME-NET(1) and ME-NET(2) devices. For example, data are transmitted by the following procedures from the ME-NET(1) device B21 to the ME-NET(2) device C21.

First, the ME-NET device B21 generates a ME-NET data frame addressed to the ME-NET device C21. A destination address DA of the ME-NET data frame designates a virtual station address "21" of the ME-NET device C21. This ME-NET data frame is converted to a miniMAP data frame by using the connecting apparatus explained with reference to FIG. 5.

The gateway GW21 converts station addresses of the devices B21 and C21 in ME-NET(1) to virtual MAC addresses with reference to the Table 7 set in advance. The minisMAP data frame thus generated is further converted to a ME-NET data frame of ME-NET(2) by using the connecting apparatus explained with reference to FIG. 4.

The gateway GW22 converts virtual MAC addresses of the devices B21 and C21 in miniMAP to station addresses of the devices B21 and C21 in ME-NET(2) with reference to the Table 7 set in advance.

As a result, the destination address DA of the ME-NET data frame is set to a station address "01" of the device C21 and data of this data frame are correctly received by the device C21.

Figure 7:
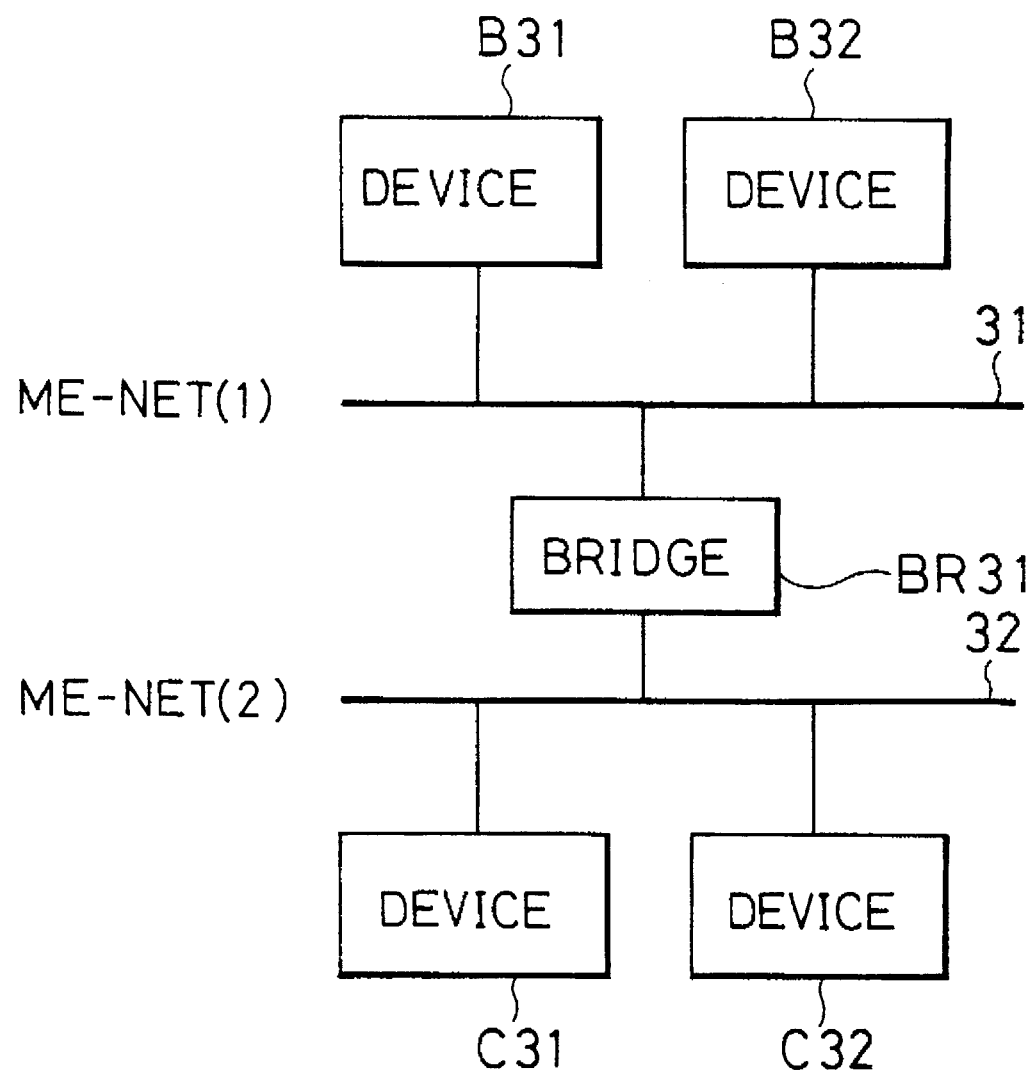
FIG. 7 is a block diagram showing the construction of a mutual connecting apparatus between networks in accordance with a seventh embodiment of the present invention.

FIG. 7 is a block diagram showing the construction of a mutual connecting apparatus between networks in accordance with a seventh embodiment of the present invention.

As shown in FIG. 7, when ME-NETs are connected to each other, electric characteristics and protocols of the ME-NETs are respectively equal to each other so that no conversion of these electric characteristics and protocols is required. However, 64 ME-NET devices are identified at its maximum by station addresses of one byte. Accordingly, there is a possibility that the station addresses overlap each other when the ME-NET devices are directly connected to each other. Therefore, address conversion is performed by using a bridge BR31 as the connecting apparatus.

Devices B31, B32 connected to ME-NET(1) and devices C31, C32 connected to ME-NET(2) must be uniquely designated in address systems of both the networks to mutually transmit and receive data between these ME-NET devices.

The construction of a connecting apparatus for respectively identifying the ME-NET(1) and ME-NET(2) devices by the ME-NET(2) and ME-NET(1) devices is similar to that shown in FIG. 6. Namely, the ME-NET(1) and ME-NET(2) devices are identified by respectively providing station addresses to the ME-NET(2) and ME-NET(1) devices as shown in the above Tables 5 and 6.

Figure 8:
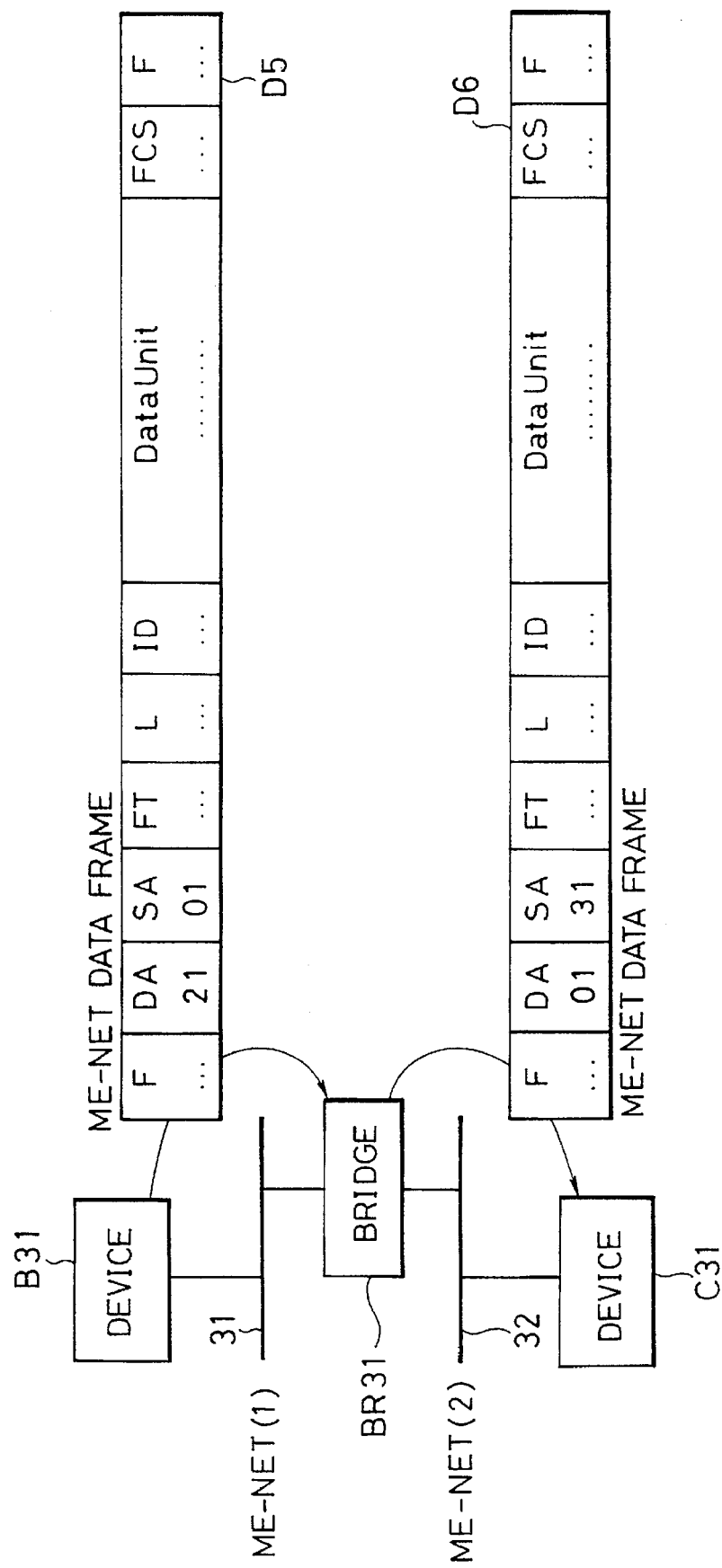
FIG. 8 is a view for explaining transmission of data between ME-NET devices using the mutual connecting apparatus between networks in the present invention.

FIG. 8 shows an example of data conversion in which data are transmitted from the ME-NET device B31 shown in FIG. 7 to the ME-MET device C31.

The ME-NET device B31 first generates and transmits a ME-NET data frame. An image of this ME-NET data frame is shown by reference numeral D5 in FIG. 8. A destination address DA indicative of a data receiving address is set to a virtual station address "21" of the ME-NET device C31. A source address SA indicative of a data sending address is set to an original station address "01" of the ME-NET device B31.

Information of the Tables 5 and 6 is set to the bridge BR31 as an internal table before this information is processed.

The above Table 7 shows a combination of the Tables 5 and 6 as one example of the information of the bridge BR31 as an internal table. In this internal table, italic addresses show virtual addresses.

Figure 12:
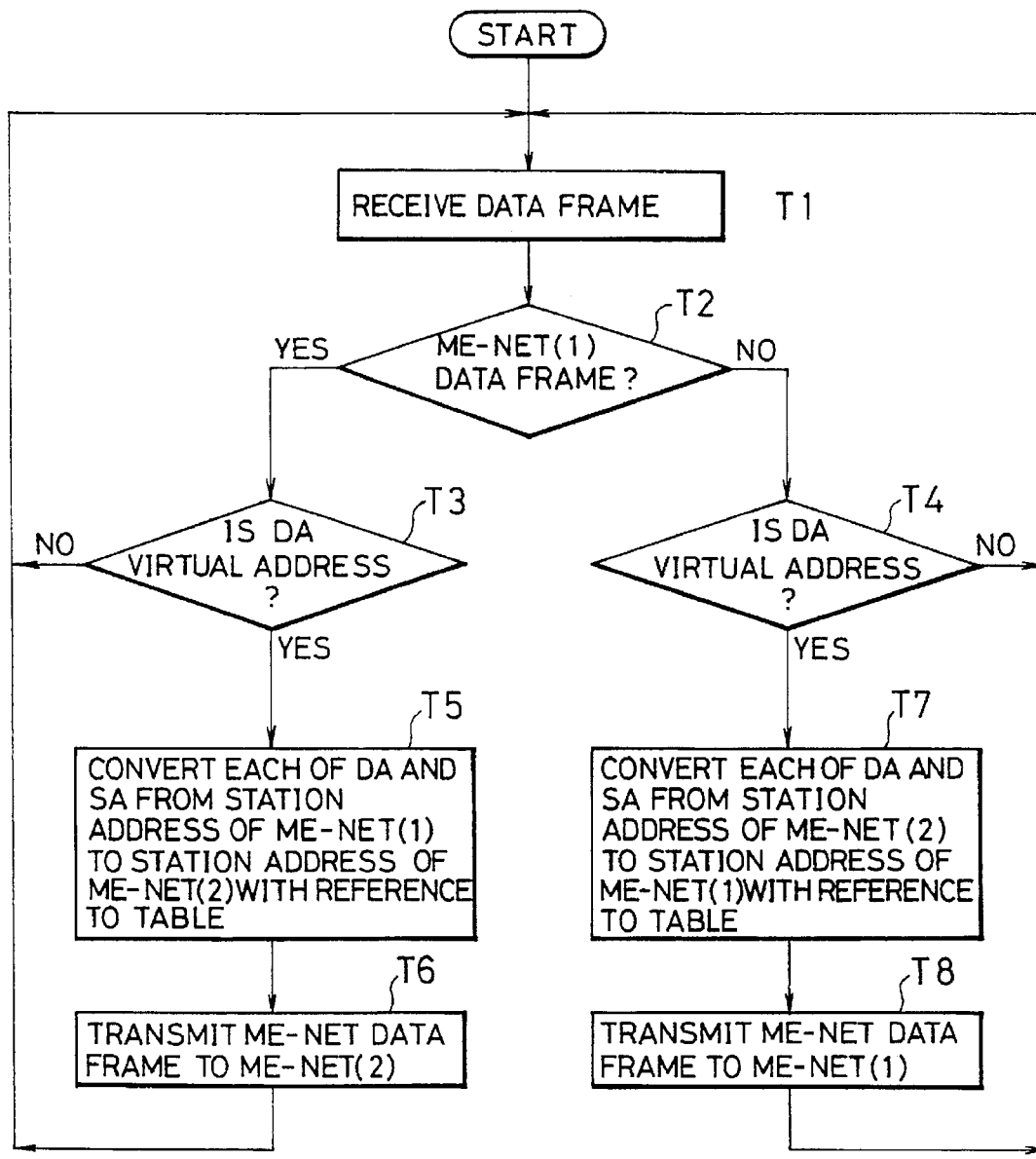
FIG. 12 is a flow chart for explaining an operation of the mutual connecting apparatus between networks of the present invention in a network environment in which ME-NET devices are connected to each other.

When the bridge BR31 receives the data frame, the bridge BR31 processes this data frame in accordance with a flow chart of FIG. 12 with reference to the internal table. A processing operation of this data frame will next be explained with reference to FIG. 12.

First, the bridge BR31 receives a data frame in a step T1. In a step T2, the bridge BR31 judges whether the BR31 receives this data frame from ME-NET(1) or ME-NET(2). In steps T3 and T4, the bridge BR31 judges whether a destination address DA of the data frame is a virtual address or not.

In FIG. 8, the data frame is set to a ME-NET(1) data frame. Therefore, the bridge BR31 knows by the Table 7 that the destination address DA is a virtual address. Accordingly, in a step T5, the bridge BR31 converts the destination address DA and a source address SA of the data frame from station addresses of ME-NET(1) to station addresses of ME-NET(2) by using the Table 7. The ME-NET data frame is then transmitted to ME-NET(2) in a step T6. An image of this ME-NET data frame is shown by reference numeral D6 in FIG. 8.

As shown by this ME-NET data frame image D6 in FIG. 8, the destination address DA indicative of a data receiving address is converted to a station address "01" of the ME-NET device C31. The source address SA indicative of a data sending address is converted to a virtual station address "31" of the ME-NET device B31.

As a result, the data frame is correctly received by the ME-NET device C31.

When the ME-NET data frame is a data frame of ME-MET(2), NET(2), the bridge BR31 knows by the Table 7 that the destination address DA is a virtual address. Accordingly, in a step T7, the bridge BR31 converts the destination address DA and the source address SA of the data frame From station addresses of ME-NET(2) to station addresses of ME-NET(1) by using the Table 7. The ME-NET data frame is then transmitted to ME-NET(1) in a step T8.

In FIG. 6, data can be transmitted and received between ME-NET(1) and ME-NET(2) by using the connecting apparatus explained with reference to FIG. 7 and different from the above-mentioned connecting apparatus.

The differences between FIGS. 6 and 7 are that the gateways GW21 and GW22 are connected to each other through miniMAP in FIG. 6, but a connecting portion of these gateways GW21 and GW22 in FIG. 6 is replaced with one bridge BR31 in FIG. 7. Therefore, data must be transmitted and received between the gateways GW21 and GW22 through the miniMAP. However, in FIG. 6, data can be transmitted and received between ME-NET(1) and ME-NET(2) by the same data processing as FIG. 7 except for the data transmission and reception between the gateways GW21 and GW22.

The data processing of the bridge BR31 in FIG. 7 is performed by one of the gateways GW21 and GW22 in FIG.

Figure 9:
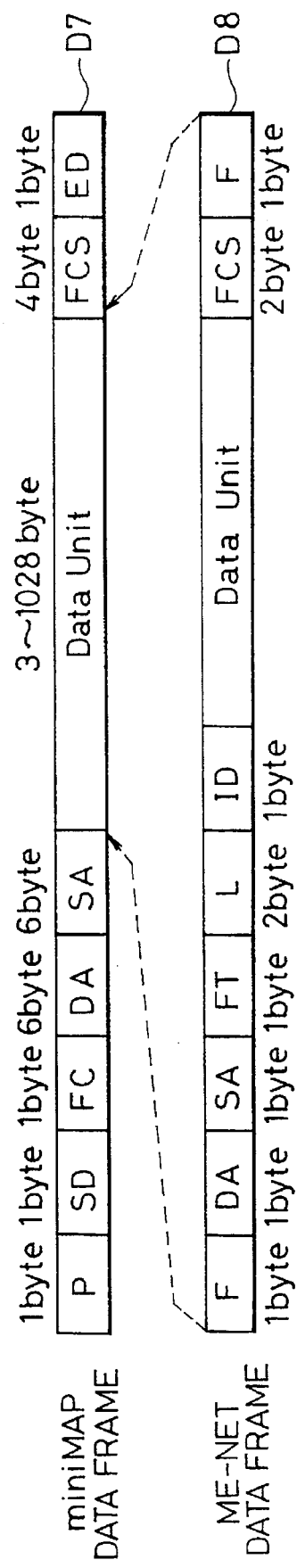
FIG. 9 is a view for explaining transmission of data in a state in which a ME-NET data frame is overlaid or superimposed on a miniMAP data frame by using the mutual connecting apparatus between networks of the present invention.

6. As shown in FIG. 9, the ME-NET data frame is transmitted by superimposing this ME-NET data frame on a data unit portion of a miniMAP data frame between the gateways GW21 and GW22. A method for transmitting and receiving the miniMAP data frame between the gateways GW21 and GW22 is completely similar to a method for exchanging the miniMAP data frame between miniMAP devices.

Figure 13:
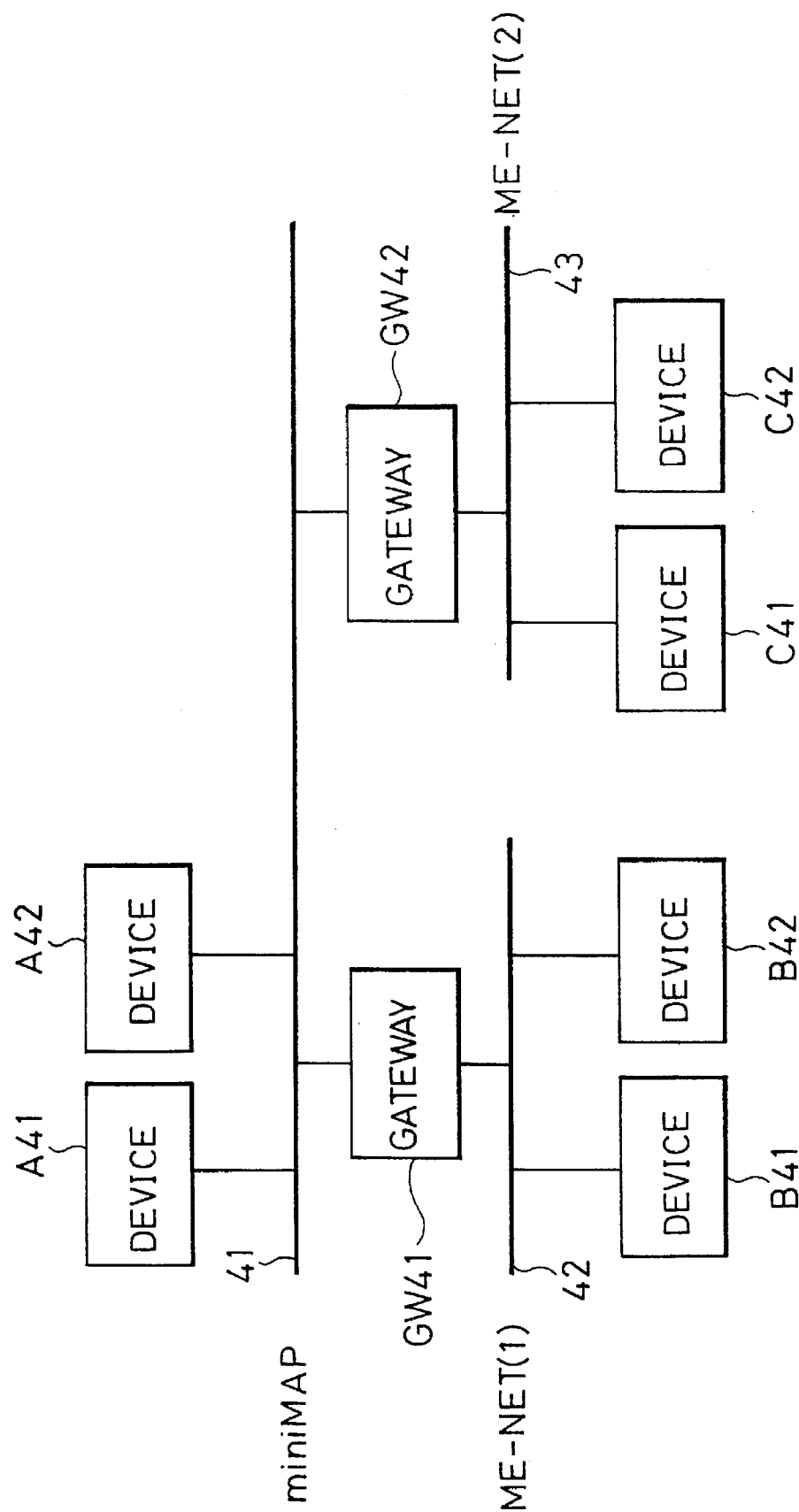
FIG. 13 is a block diagram showing the construction of a mutual connecting apparatus between networks in accordance with an eighth embodiment of the present invention.

FIG. 13 is a block diagram showing the construction of a mutual connecting apparatus between networks in accordance with an eighth embodiment of the present invention.

In the mutual connecting apparatus shown in FIG. 13, miniMAP and ME-NET are connected to each other through a gateway. The mutual connecting apparatus shown in FIG. 13 can provide addresses shown in the following Table 8.

TABLE 8

| device name | MAC address | LSAP address | station address |
|---|---|---|---|
| A1 | 0000000000A1 | 01 | |
| A2 | 0000000000A2 | 01 | |
| GW1 | 0000000000F1 | 50 | 10 |
| GW2 | 0000000000F2 | 50 | 10 |
| B1 | | | 01 |
| B2 | | | 02 |
| C1 | | | 01 |
| C2 | | | 02 |

A MAC address and a Local Service Access Point (LSAP) address are provided to devices A41 and A42 connected to the miniMAP and shown in FIG. 13. Station addresses are provided to devices B41, B42, C41 and C42 connected to the ME-NET.

A MAC address, a LSAP address and a station address are provided to gateways GW41 and GW42. All address notations in the above Table 8 are set to hexadecimal notation.

When data are transmitted and received between the above devices, a data frame must be generated and data sending and receiving addresses must be set to the generated data frame.

Figure 18:
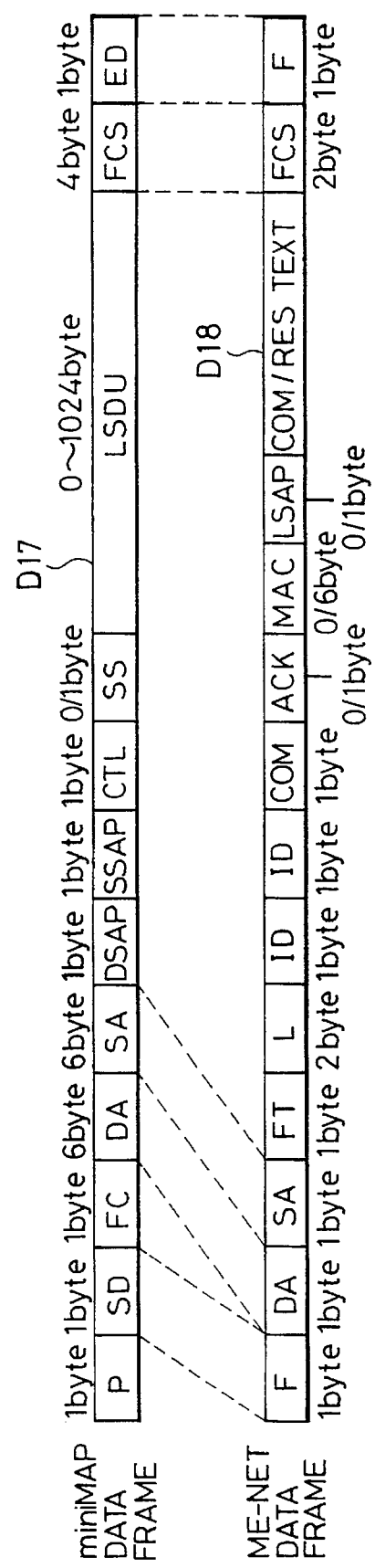
FIG. 18 is a view for explaining a data frame structure of the mutual connecting apparatus between networks of the present Invention in a network environment in which ME-NET and miniMAP devices are connected to each other.

FIG. 18 shows a constructional example of the data frame.

In FIG. 18, reference numerals P, SD, ED and F respectively designate a preamble, a starting delimiter, an ending delimiter and a starting/ending flag. Reference numerals FC, DA and SA respectively designate frame control, a destination address as a data receiving address (MAC/station number), and a source address as a data sending address (NIAC/station number). Reference numerals FT, L and ID respectively designate a frame type, a frame length and an LLC frame identifier. Reference numerals COM, ACK, CTL and SS respectively designate a command code, executed command results, a control section and a state subfield. Reference numerals MAC, LSAP, FCS and DSAP respectively designate a MAC address for sending and receiving data, a LSAP address for sending and receiving data, a frame check sequence, and a destination LSAP address for receiving data. Reference numerals SSAP, LSDU and COM/RES TEXT respectively designate a source LSAP address for sending data, an LLC service data unit, and command or response data.

As shown in FIG. 18, the data receiving address in a miniMAP data frame is designated by a destination address DA and an address DSAP.

The destination address DA is a MAC address of 6 bytes. The address DSAP is a LSAP address of one byte. The data sending address is designated by a source address SA and an address SSAP. Similarly, the source address SA is a MAC address and the address SSAP is a LSAP address.

In a ME-NET data frame, a data receiving address is designated by a destination address DA and a data sending address is designated by a source address SA. Each of the destination address DA and the source address SA is set to a station address of one byte. An allowable value of the station address is limited to 64 values ranged from 01 to 40 in hexadecimal notation. Communication data are stored to each of LSDU of the miniMAP data frame and COM/RES TEST of the ME-NET data frame.

Figure 14:
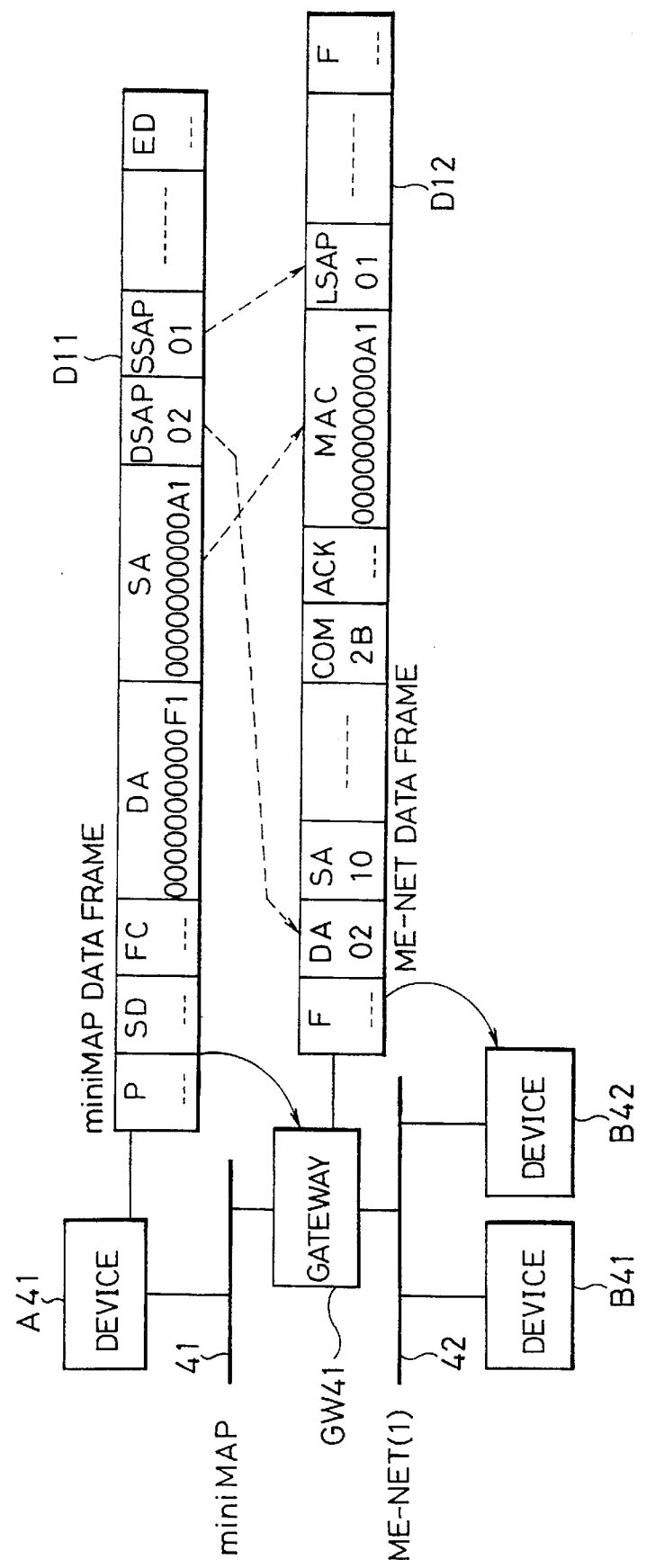
FIG. 14 is a block diagram showing the construction of a mutual connecting apparatus between networks in accordance with a ninth embodiment of the present invention.

FIG. 14 shows a case in which data are transmitted from a miniMAP device A41 to a ME-NET device B42. The miniMAP device A41 first generates a miniMAP data frame D11. A MAC address "0000000000F1" of a gateway GW41 for receiving the miniMAP data frame is substituted into a destination address DA of the miniMAP data frame generated by this miniMAP device A41. A station address "02" of the ME-NET device B42 for receiving data is substituted into an address DSAP. Thus, a data receiving device is uniquely identified as the ME-NET(1) device B42 by the gateway GW41. A MAC address "0000000000A1" and a LSAP address "01" of the miniMAP device A41 are respectively substituted into a source address SA and an address SSAP.

The block diagram illustrated in FIG. 14 also shows the construction of a mutual connecting apparatus between networks in accordance with a ninth embodiment of the present invention.

The mutual connecting apparatus between networks illustrated in FIG. 14 shows conversion from the miniMAP data frame D11 to a ME-NET data frame D12.

The miniMAP data frame generated by the miniMAP device A41 is transmitted to a relay gateway GW41. The gateway GW41 converts the miniMAP data frame to a ME-NET data frame.

Figure 19:
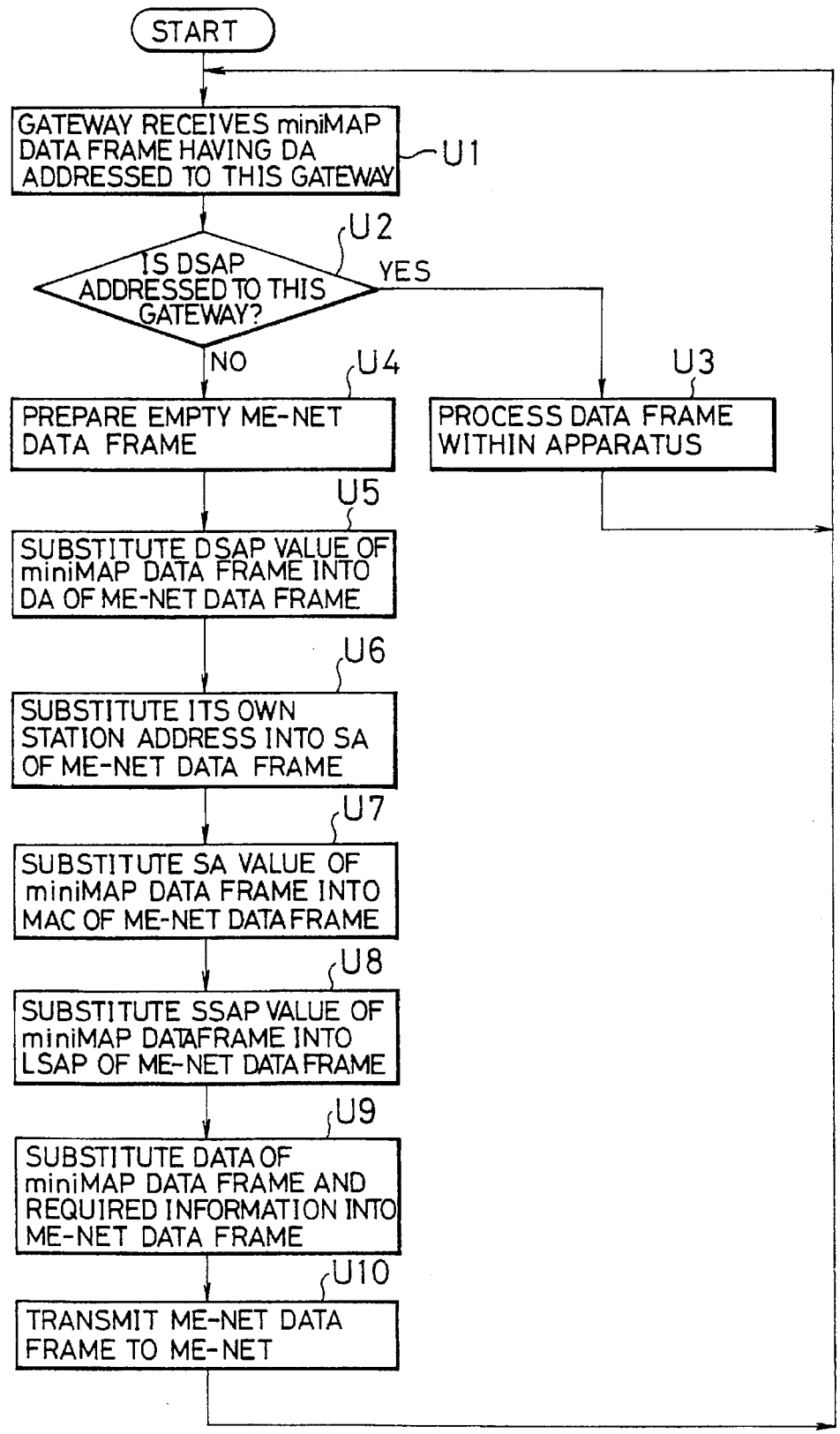
FIG. 19 is a flow chart for explaining one example of a processing operation of a gateway as one example of the mutual connecting apparatus between networks of the present invention.

A processing operation of the mutual connecting apparatus shown in FIG. 14 will next be explained with reference to a flow chart shown in FIG. 19.

In a step U1, the gateway GW41 first receives a miniMAP data frame in which the destination address DA is in conformity with a MAC address "0000000000F1" of this gateway GW41. In a step U2, the gateway GW41 checks the value of an address DSAP. If this value of the address DSAP is in conformity with a LSAP address "50" of the gateway GW41, contents of this miniMAP data frame are addressed to this gateway GW41. Accordingly, these contents of the miniMAP data frame are processed within the gateway GW41 in a step U3. Thereafter, an operating state of the gateway GW41 is changed to a standby state until the gateway GW41 receives a new data frame.

In FIG. 14, no address DSAP is in conformity with the LSAP address of the gateway GW41. Accordingly, in a step U4, the gateway GW41 prepares an empty ME-NET data frame to transfer data. In a step US, a value "02" of the address DSAP of the miniMAP data frame is substituted into a destination address DA of the ME-NET data frame. This address DSAP is a station address of the ME-NET device B42 for receiving the ME-NET data frame. In a step U6, a station address "10" of the gateway GW41 is substituted into a source address SA of the ME-NET data frame indicative of a data sending address. In steps U7 and US, a value "0000000000A1" of a source address SA and a value "01" of an address SSAP of the miniMAP data frame are respectively substituted into addresses MAC and LSAP of the ME-NET data frame.

The addresses MAC and LSAP are used in a region arranged for option commands of ME-NET to show a MAC address and a LSAP address of the miniMAP device A41 for firstly sending data. A value "2B" indicative of the option commands is substituted into COM of the ME-NET data frame. Further, in a step U9, data transmitted by the miniMAP data frame and information required to completely make the ME-NET data frame are substituted into the ME-NET data frame so that the ME-NET data frame is completely made. The completed ME-NET data frame is transmitted to ME-NET in a step U10. The gateway GW41 attains a standby state until the gateway GW41 receives a new data frame.

In accordance with the above-mentioned procedures, the miniMAP data frame generated by the miniMAP device A41 is converted to a ME-NET data frame by the gateway GW41 and is received by the ME-NET device B42. When the gateway GW41 receives the data frame, the gateway GW41 judges whether this data frame is addressed to the gateway GW41 or not by comparing an address DSAP and a LSAP address of this gateway GW41 with each other. When these addresses are in conformity with each other, it is judged that this data frame is addressed to the gateway GW41. Accordingly, when the LSAP address is allocated to the gateway GW41, it is necessary to allocate the LSAP address such that no LSAP address overlaps a station address of the ME-NET device.

The station address of the ME-NET device is ranged from 01 to 40 in hexadecimal notation. Accordingly, no LSAP address overlaps the station address of the ME-NET device if an address value equal to or greater than 41 is allocated to the LSAP address of the gateway GW41.

In the ninth embodiment shown in FIG. 14, the option commands are used in the ME-NET data frame. However, a device for receiving the option commands must correspond to the option commands so as to correctly receive and judge the option commands. If it is necessary to transmit data to a device which does not correspond to the option commands, it is necessary to take another data transmitting measure.

In a connecting apparatus for transmitting data from a miniMAP device to a ME-NET device, data can be also transmitted to a ME-NET device which does not correspond to option commands.

Figure 15:
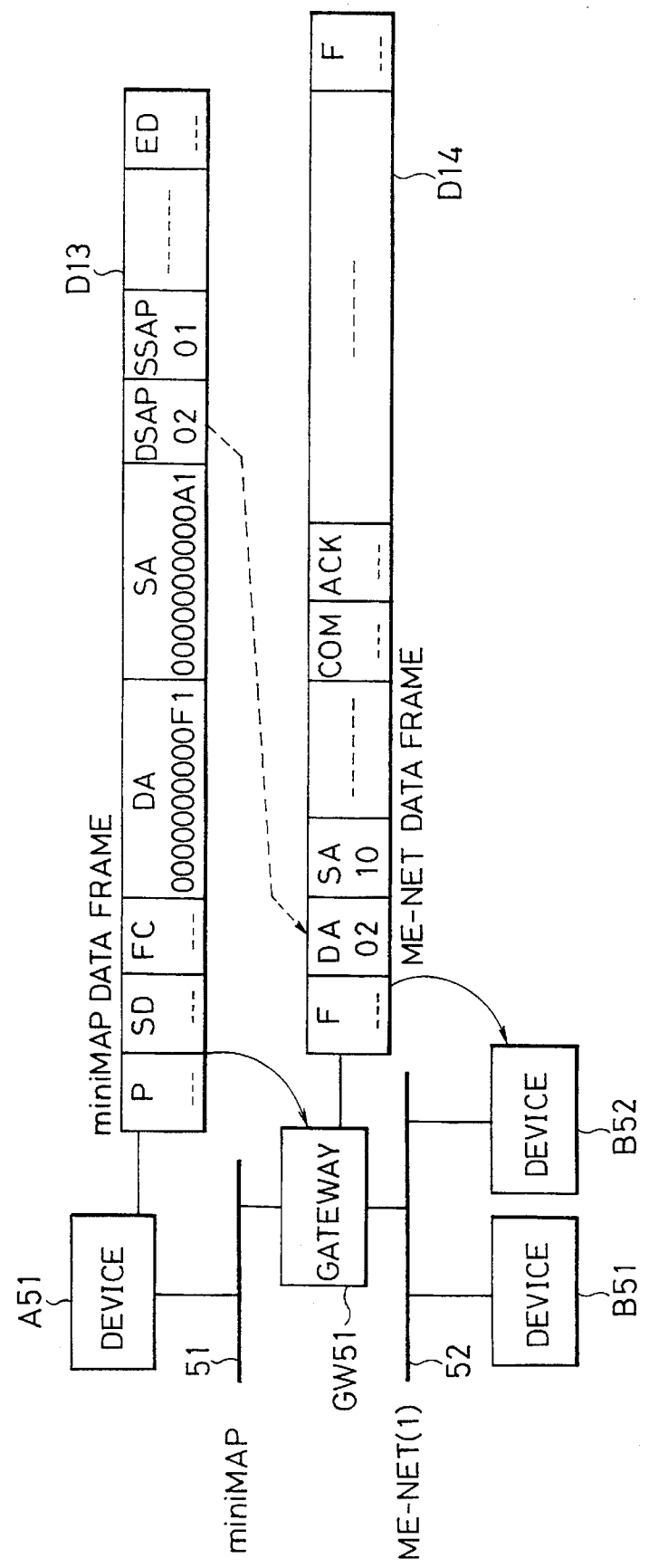
FIG. 15 is a block diagram showing the construction of a mutual connecting apparatus between networks in accordance with a tenth embodiment of the present invention.

FIG. 15 is a block diagram showing the construction of a mutual connecting apparatus between networks in accordance with a tenth embodiment of the present invention.

In FIG. 15, similar to FIG. 14, a miniMAP data frame is generated by a miniMAP device A51 and is received by a relay gateway GW51. The miniMAP data frame is then converted to a ME-NET data frame by the gateway GW51. In this case, the miniMAP data frame is converted to a data frame of normal commands without using any option commands.

Figure 20:
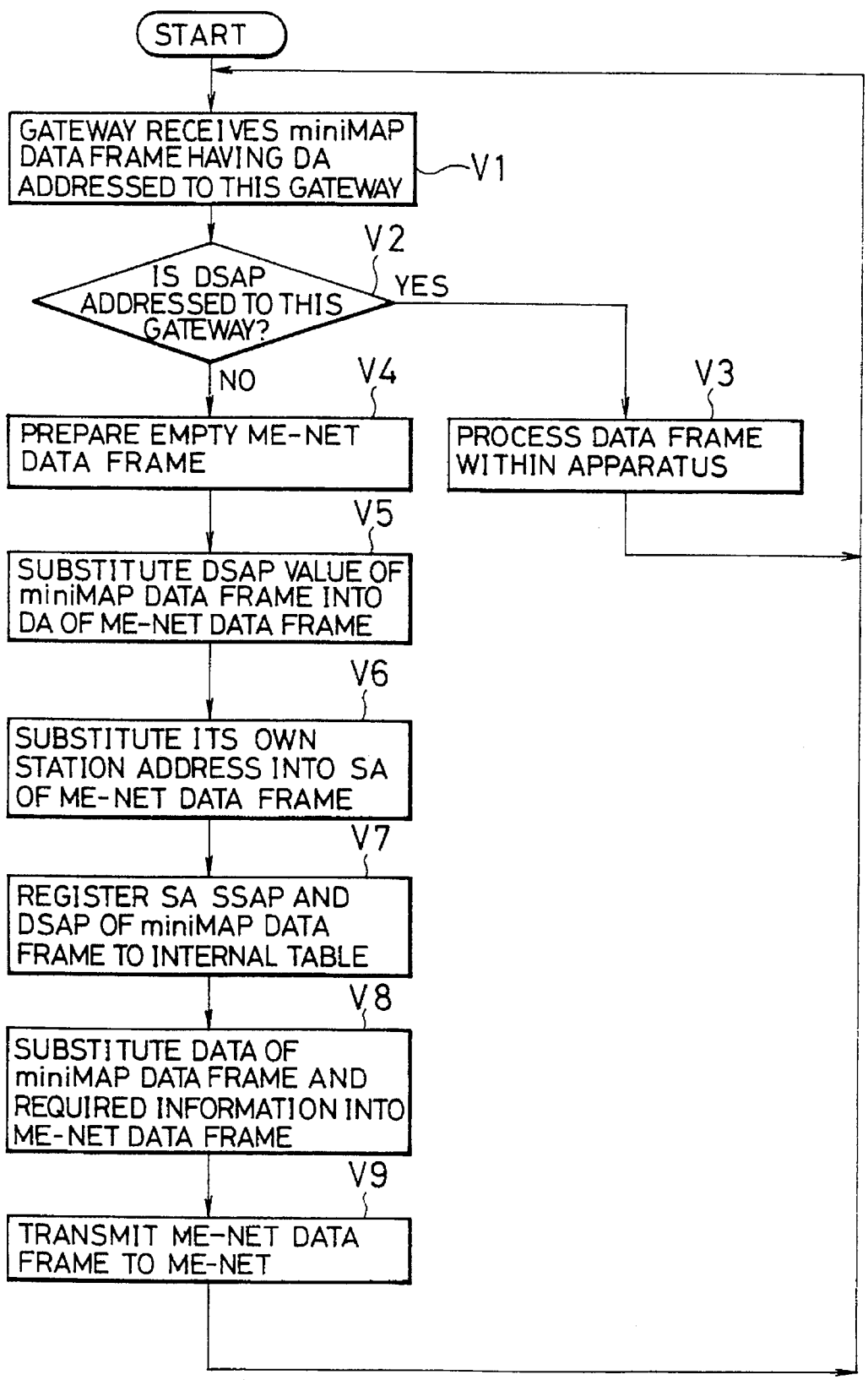
FIG. 20 is a flow chart for explaining another example of the processing operation of the gateway as one example of the mutual connecting apparatus between networks of the present invention.

Procedures of a converting operation of the gateway GW51 will next be explained with reference to a flow chart of FIG. 20.

First, in a step V1, the gateway GW51 receives a miniMAP data frame in which a destination address DA is in conformity with a MAC address "0000000000F1" of the gateway GW51. In a step V2, the gateway GW51 checks a value of an address DSAP. If this value of the address DSAP is in conformity with a LSAP address value "50" of the gateway GW51, contents of the miniMAP data frame are addressed to the gateway GW51. Accordingly, this miniMAP data frame is processed within the gateway GW51 in a step V3. Thereafter, the gateway GW51 attains a standby state until the gateway GW51 receives a new data frame.

In FIG. 15, no address DSAP is in conformity with the LSAP address of the gateway GW51. Accordingly, in a step V4, the gateway GW51 prepares an empty ME-NET data frame to transfer data. In a step V5, a value "02" of the address DSAP of the miniMAP data frame is substituted into a destination address DA of the ME-NET data frame. This value of the address DSAP is a station address of a ME-NET device B52 for receiving data. In a step V6, a station address "10" of the gateway GW51 is substituted into a source address of the ME-NET data frame indicative of a data sending address. In a step V7, a value "0000000000A1" of a source address SA as a MAC address, a value "01" of an address SSAP as a LSAP address, and the value "02" of the address DSAP as a station address in the miniMAP data frame are registered to an internal table of the gateway GW51. The following Table 9 shows one example of this internal table of the gateway GW51.

TABLE 9

| control number | MAC address | LSAP address | station address |
| --- | --- | --- | --- |
| 1 | 0000000000A1 | 01 | 02 |
| 2 | ......... | | |
| 3 | ......... | | |
| 4 | | | |

Further, in a step V8, data transmitted by the miniMAP data frame and information required to completely make the ME-NET data frame are substituted into the ME-NET data frame so that the ME-NET data frame is completely made. The completed ME-NET data frame is transmitted to ME-NET in a step V9. The gateway GW51 attains a standby state until the gateway GF51 receives a new data frame.

In accordance with the above-mentioned procedures, the miniMAP data frame generated by the miniMAP device A51 is converted to a ME-NET data frame by the gateway GW51 and is received by the ME-NET device B52.

In the above connecting apparatus, data can also be transmitted from the miniMAP device to a device which does not correspond to option commands. However, no data sending address is transmitted to this device which does not correspond to option commands. When it is necessary to transmit responsive data responding to the received data to a data sending device, the responsive data are transmitted to the data sending device through the relay gateway GW51 on the basis of address information registered to the above table in advance.

Figure 16:
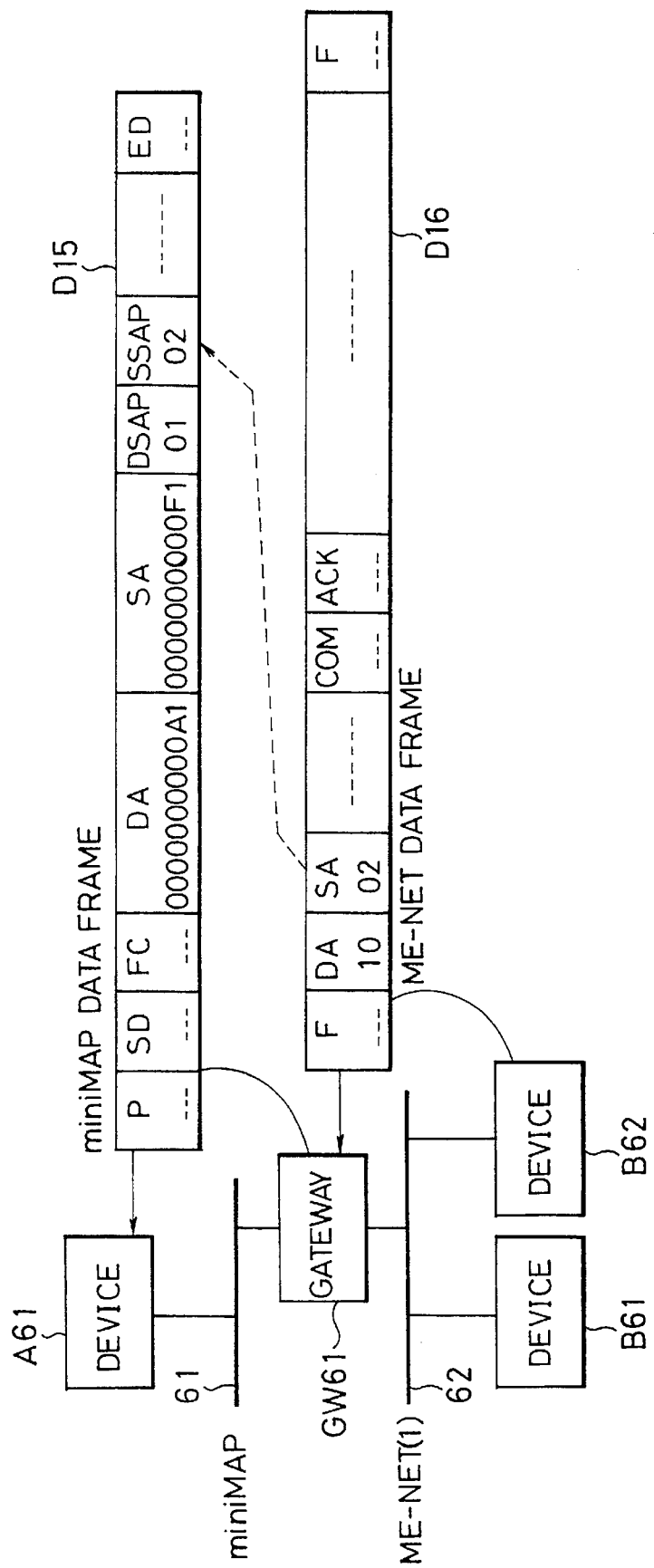
FIG. 16 is a block diagram showing the construction of a mutual connecting apparatus between networks in accordance with an eleventh embodiment of the present invention.

FIG. 16 is a block diagram showing the construction of a mutual connecting apparatus between networks in accordance with an eleventh embodiment of the present invention.

In FIG. 16, responsive data responding to data transmitted from the miniMAP device A51 to the ME-NET device B52 in FIG. 15 are generated as a ME-NET data frame by the ME-NET device B52. This ME-NET data frame is received by the relay gateway GW51 and is converted to a miniMAP data frame by the gateway GW51. In this case, a MAC address and a LSAP address of the miniMAP device A51 are substituted into the miniMAP data frame as data sending addresses with reference to an internal table.

Figure 21:
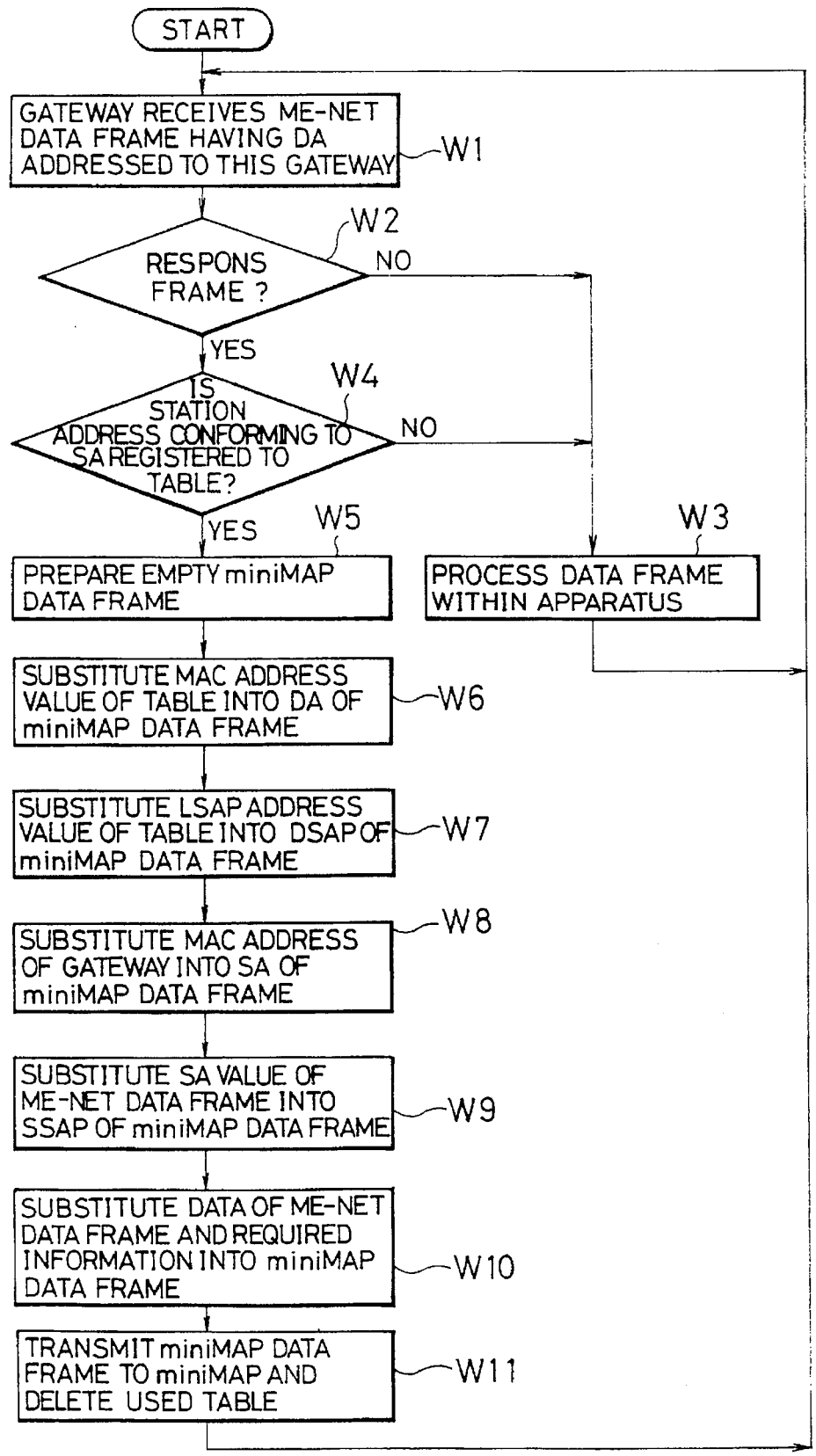
FIG. 21 is a flow chart for explaining another example of the processing operation of the gateway as one example of the mutual connecting apparatus between networks of the present invention.

Processing procedures of the converting operation of a gateway GW61 will next be explained with reference to a flow chart of FIG. 21.

First, in a step W1, the gateway GW61 receives a ME-NET data frame in which a destination address DA is in conformity with a station address "10" of the gateway GW61. In a step W2, the gateway GW61 judges whether this ME-NET data frame is a response frame or not. This judgment is made by checking an ID value. If no ME-NET data frame is a response frame, data of the ME-NET data frame are data except for a relay data object so that this ME-NET data frame is processed within the gateway GW61 in a step W3. Thereafter, the gateway GW61 attains a standby state until the gateway GW61 receives a new data frame.

In FIG. 16, the ME-NET data frame is set to a response frame. Accordingly, in a step W4, the gateway GW61 searches a station address value of an internal table of the gateway GW61 conforming to a value "02" of a source address SA by collating the station address value and the source address value with each other. The above Table 9 shows an example of this internal table.

When there is no station address conforming to the source address SA, data of the ME-NET data frame are data except for a relay data object so that this ME-NET data frame is processed within the gateway GW61 in the above step W3. Thereafter, the gateway GW61 attains a standby state until the gateway GW61 receives a new data frame.

In FIG. 16, a station address indicated by control number 1 in the above Table 9 is in conformity with the value "02" of the source address SA. Accordingly, in a step W5, the gateway GW61 prepares an empty miniMAP data frame to transfer data. Then, a MAC address "0000000000A1" and a LSAP address "01" of the internal table are respectively substituted into a destination address DA and an address DSAP of a miniMAP data frame in steps W6 and W7.

This destination address is an address of a miniMAP device A61 for receiving data. In a step W8, a MAC address "0000000000F1" of the gateway GW61 is substituted into a source address SA of the miniMAP data frame indicative of a data sending address by using the connecting apparatus. In a step W9, a value of the source address SA of the ME-NET data frame as a station address of a ME-NET device B62 is substituted into an address SSAP of the miniMAP data frame by using the connecting apparatus. Further, in a step W10, data transmitted by the ME-NET data frame and information required to completely make the miniMAP data frame are substituted into the miniMAP data frame so that this miniMAP data frame is completely made. The completed miniMAP data frame is transmitted to miniMAP and used table data are erased in a step W11.

The MAC address, the LSAP address and the station address shown by the control number 1 are erased from the above Table 9. Thereafter, the gateway GW61 attains a standby state until the gateway GW61 receives a new data frame.

Thus, the ME-NET data frame for response generated by the ME-NET device B62 is converted to a miniMAP data frame by the gateway GW61 and is received by the miniMAP device A61.

Figure 17:
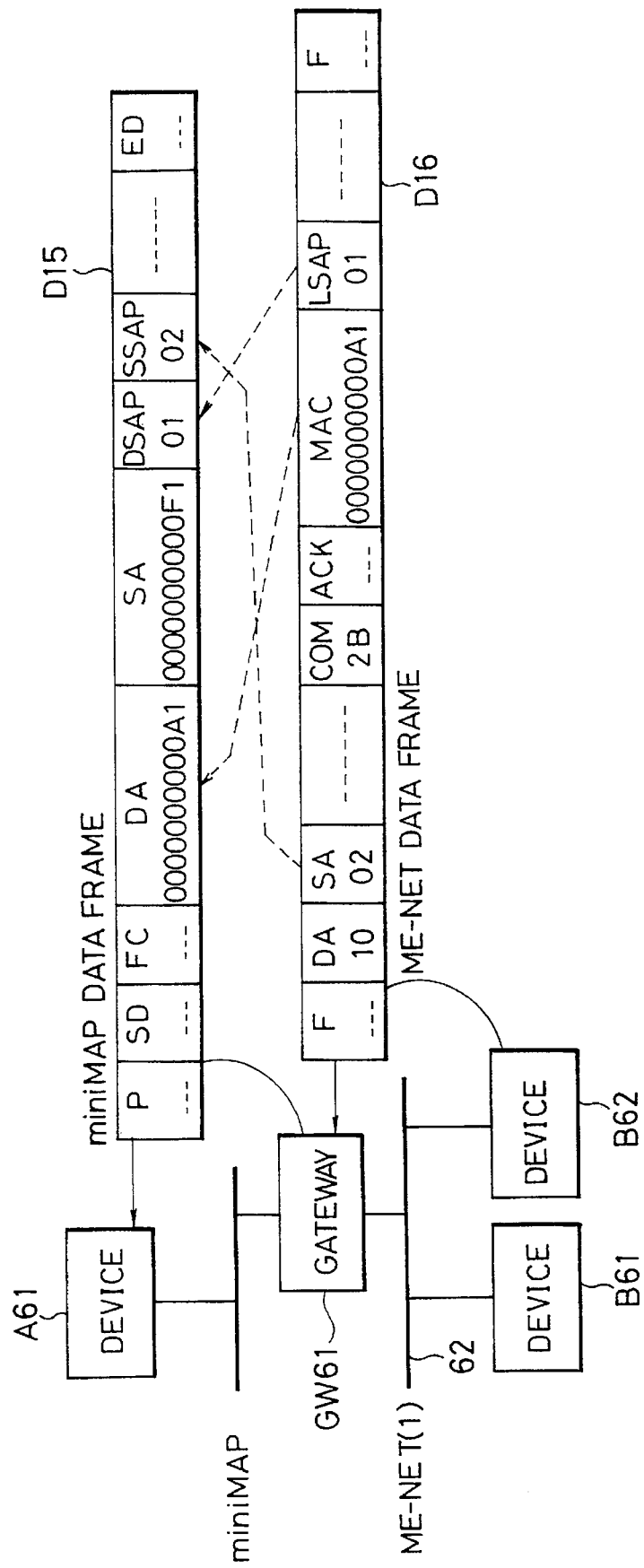
FIG. 17 is a block diagram showing the construction of a mutual connecting apparatus between networks in accordance with a twelfth embodiment of the present invention.

FIG. 17 is a block diagram showing the construction of a mutual connecting apparatus between networks in accordance with a twelfth embodiment of the present invention.

FIG. 17 shows a transmitting state of data from a ME-NET device B62 to a miniMAP device A61.

First, the ME-NET device B62 generates a ME-NET data frame D16. Option commands are used in this generated ME-NET data frame D16. A MAC address "0000000000A1" and a LSAP address "01" of the miniMAP device A61 are respectively substituted into addresses MAC and LSAP of the ME-NET data frame D16. Thus, it is uniquely designated that a final data receiving device is the miniMAP device A61.

A station address "10" of a gateway GW61 for relaying data is also substituted into a destination address DA. Further, a station address "02" of the ME-NET device B62 is substituted into a source address SA. The ME-NET data frame D16 shown in FIG. 17 is also converted to a miniMAP data frame D15 by the connecting apparatus.

The ME-NET data frame generated by the ME-NET device B62 is received by the relay gateway GW61 and is converted to a miniMAP data frame by this gateway GW61.

Figure 22:
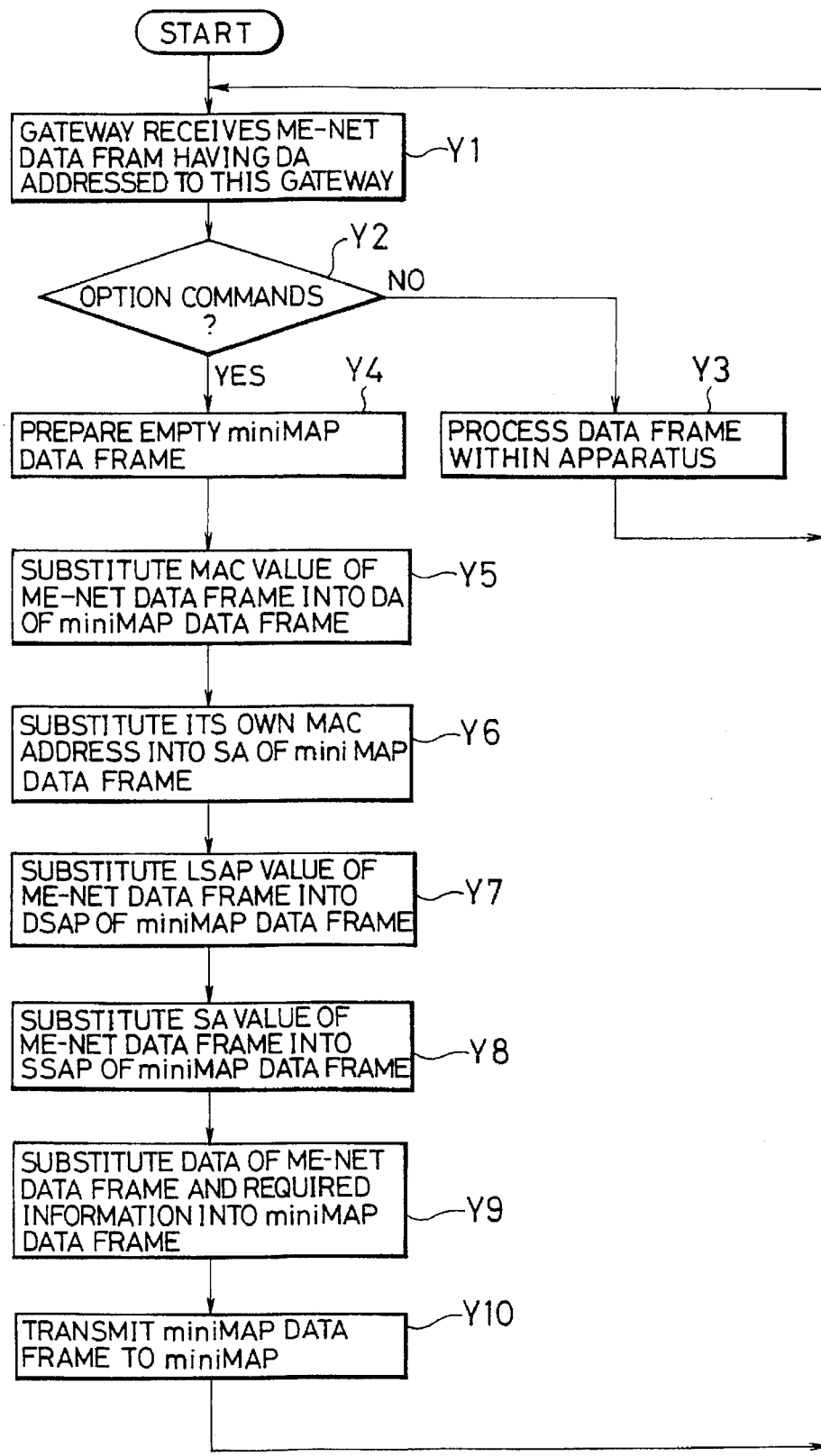
FIG. 22 is a flow chart for explaining another example of the processing operation of the gateway as one example of the mutual connecting apparatus between networks of the present invention.

Processing procedures of a converting operation of the gateway GW61 will next be explained with reference to a flow chart of FIG. 22.

First, in a step Y1, the gateway GW61 receives a ME-NET data frame in which a destination address DA is in conformity with a station address "10" of the gateway GW61. In a step Y2, the gateway GW61 checks a COM value. If the ME-NET data frame shows a COM value except for "2B", no ME-NET data frame shows option commands. Accordingly, this ME-NET data frame is processed as a data frame except for a relay object within the gateway GW61 in a step Y3. Thereafter, the gateway GW61 attains a standby state until the gateway GW61 receives a new data frame.

In FIG. 17, the COM value is set to "2B" so that the ME-NET data frame shows option commands. Accordingly, in a step Y4, the gateway GW61 prepares an empty miniMAP data frame to transfer data. In a step Y5, a value "0000000000A1" of an address MAC of the ME-NET data frame is substituted into a destination address DA of the miniMAP data frame. This MAC address is a MAC address of the miniMAP device A61 for receiving data. In a step Y6, a MAC address "0000000000F1" of the gateway GW61 is substituted into a source address SA of the miniMAP data frame indicative of a data sending address by using the connecting apparatus. In a step Y7, a value "01" of an address LSAP of the ME-NET data frame is substituted into an address DSAP of the miniMAP data frame. In a step Y8, a value "02" of a source address SA of the ME-NET data frame is substituted into an address SSAP of the miniMAP data frame by using the connecting apparatus. This source address SA is a station address of the ME-NET device B62. Further, in a step Y9, data transmitted by the ME-NET data frame and information required to completely make the miniMAP data frame are substituted into the miniMAP data frame so that this miniMAP data frame is completely made. The completed miniMAP data frame is transmitted to miniMAP in a step Y10. The gateway GW61 then attains a standby state until the gateway GW61 receives a new data frame.

In accordance with the above processing procedures, the ME-NET data frame generated by the ME-NET device B62 is converted to a miniMAP data frame by the gateway GW61 and is received by the miniMAP device A61.

As mentioned above, in accordance with a first construction of a mutual connecting apparatus between networks of the present invention, a specified address of an identifying device is virtually provided to an identified device in plural devices forming a network so that the identifying device uniquely identifies the identified device. Accordingly, data can be mutually transmitted and received between one network device and another network device by using virtual addresses.

In accordance with a second construction of the present invention, the identifying device is a mini manufacturing automation protocol device (which is called a miniMAP device in the following description); the identified device is a mechatronics network device (which is called a ME-NET device in the following description); the specified address is a media access control address (which is called a MAC address in the following description) of the miniMAP; and the miniMAP device uniquely identifies the ME-NET device by virtually providing the MAC address to the ME-NET device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with a third construction of the present invention, the identifying device is a ME-NET device; the identified device is a miniMAP device; the specified address is a station address of the ME-NET; and the ME-NET device uniquely identifies the miniMAP device by virtually providing the station address to the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with a fourth construction of the present invention, the plural devices are ME-NET devices; the specified address is a station address; and one ME-MET device uniquely identifies another ME-NET device in the plural ME-NET devices by virtually providing a station address unused in this one ME-NET device to this another ME-NET device. Accordingly, data can be mutually transmitted and received between the ME-NET devices connected through a network by connecting the ME-NET devices to each other through the mutual connecting apparatus and mutually using virtual addresses.

In accordance with a fifth construction of the present invention, the plural devices forming the network are constructed by at least two network devices of different kinds; the connecting apparatus has a built-in table for making an original address of one network device correspond to a virtual address of this one network device seen from another network device; and an address of a data frame is converted by using the built-in table from an address in a data transmitting side network to an address in a data receiving side network when the data frame is relayed from the one network to the another network. Accordingly, data can be mutually transmitted and received between the one and another network devices connected through a network by connecting these network devices to each other through the mutual connecting apparatus and mutually using virtual addresses.

In accordance with a sixth construction of the present invention, the miniMAP device uniquely identifies a network connected to the ME-NET device by designating a MAC address of the connecting apparatus connecting the mutual networks as a value of a destination address (DA) of a miniMAP data frame transmitted to the connecting apparatus from the miniMAP device and a value of a source address (SA) of the miniMAP data frame transmitted from the connecting apparatus to the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with a seventh construction of the present invention, the miniMAP device uniquely identifies the ME-NET device by designating a station address; the station address is additionally provided to the ME-NET device as a value of a destination service access point address (which is called a DSAP address in the following description) of a miniMAP data frame transmitted from the miniMAP device to the connecting apparatus when data are transmitted from the miniMAP device to the ME-NET device; and the station address is also additionally provided to the ME-NET device as a value of a source service access point address (which is called a SSAP address in the following description) of the miniMAP data frame transmitted from the connecting apparatus to the miniMAP device when data are transmitted from the ME-NET device to the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with an eighth construction of the present invention, the ME-NET device uniquely identifies the miniMAP device by storing an address of the miniMAP to a data region for option commands by using the option commands in a ME-NET data frame used between the ME-NET device and the connecting apparatus when data are exchanged between the ME-NET device and the miniMAP device. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with a ninth construction of the present invention, when a miniMAP data frame generated by the miniMAP device reaches the connecting apparatus and protocol conversion is performed from the miniMAP data frame to the ME-NET data frame, a value of a DSAP address of the mini manufacturing automation protocol data frame is substituted into a destination address (DA) of the ME-NET data frame, a station address of the connecting apparatus is substituted into a source address (SA) of the ME-NET data frame, values of a source address (SA) and a SSAP address of the miniMAP data frame are substituted into the data region for the option commands of the ME-NET data frame, and data are transmitted from the miniMAP device to the ME-NET device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with a tenth construction of the present invention, when a miniMAP data frame generated by the miniMAP device reaches the connecting apparatus and protocol conversion is performed from the miniMAP data frame to the ME-NET data frame, a value of a DSAP address of the miniMAP data frame is substituted into a destination address (DA) of the ME-NET data frame, a station address of the connecting apparatus is substituted into a source address (SA) of the ME-NET data frame, values of a source address (SA), a SSAP address and the DSAP address of the miniMAP data frame are registered to an internal table of the connecting apparatus, and data are transmitted from the miniMAP device to the ME-NET device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with an eleventh construction of the present invention, when the ME-NET data frame generated by the ME-NET device reaches the connecting apparatus and protocol conversion is performed from the ME-NET data frame to the miniMAP data frame, the connecting apparatus searches a station address conforming to a value of the source address (SA) of the ME-NET data frame from the internal table, a MAC address of the internal table is substituted into a destination address (DA) of the miniMAP data frame, the MAC address of the connecting apparatus is substituted into the source address (SA) of the miniMAP data frame, a local service access point address (LSAP address) of the internal table is substituted into the DSAP address of the miniMAP data frame, a value of the source address (SA) of the ME-NET data frame is substituted into the SSAP address of the miniMAP data frame, and responsive data responding to the transmitted data are transmitted from the ME-NET device to the miniMAP device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

In accordance with a twelfth construction of the present invention, when the ME-NET data frame generated by the ME-NET device reaches the connecting apparatus and protocol conversion is performed from the ME-NET data frame to the miniMAP data frame, a MAC address in the data region for the option commands of the ME-NET data frame is substituted into a destination address (DA) of the miniMAP data frame, a MAC address of the connecting apparatus is substituted into the source address (SA) of the miniMAP data frame, a local service access point address (LSAP address) in the data region for the option commands of the ME-NET data frame is substituted into the DSAP address of the miniMAP data frame, a value of the source address (SA) of the ME-NET data frame is substituted into the SSAP address of the miniMAP data frame, and responsive data responding to the transmitted data are transmitted from the ME-NET device to the miniMAP device through the connecting apparatus. Accordingly, data can be mutually transmitted and received between the different miniMAP and ME-NET devices connected through a network by connecting the mini MAP and ME-NET devices to each other through the mutual connecting apparatus and mutually using virtual addresses.

Many widely different embodiments of the present invention may be constructed without departing from the spirit and scope of the present invention. It should be understood that the present invention is not limited to the specific embodiments described in the specification, except as defined in the appended claims.

What is claimed is:

1. A mutual connecting apparatus for connecting a first network having a first protocol and including at least one first device, and a second network having a second protocol and including at least one second device, said mutual connecting apparatus comprising:

an address providing means for providing a virtual address based on said first protocol to said second device;

an address table for making an original address of said second device correspond to one of unused addresses in said first network as said virtual address, said address table being established prior to transmission of a data frame;

an identifying means for identifying said second device through both of said original address and said virtual address by referring said address table; and a relaying means for relaying a data frame transmitted from said first network to said second device by converting a destination address, a source address and a protocol thereof when said identifying means identifies said destination address is said virtual address in said address table, and wherein said mutual connecting apparatus is capable of connecting a plurality of the first devices and a plurality of the second devices therethrough.

2. A mutual connecting apparatus according to claim 1, wherein said first protocol is a mini manufacturing automation protocol, said second protocol is a protocol of a mechatronics network and said virtual address is a media access control address of the mini manufacturing automation protocol.

3. A mutual connecting apparatus according to claim 1, wherein said first protocol is a protocol of a mechatronics network, said second protocol is a mini manufacturing automation protocol and said virtual address is a station address of the mechatronics network.

4. A mutual connecting apparatus according to claim 1, wherein each of said first and second network has a protocol of a mechatronics network and said virtual address is an unused station address in said first network.

5. A mutual connecting apparatus for connecting a first network having a first protocol and including at least one first device, and a second network having a second protocol and including at least one second device, said mutual connecting apparatus comprising:

an address obtaining means for obtaining both of (a1) an address based on said first protocol and (a2) an address based on said second protocol from unused addresses in each of said first and second networks with respect to said mutual connecting apparatus prior to transmission of a data frame;

a data converting means for converting a data frame of said first network into a data frame of said second network; and a relaying means for relaying said data frame of said first network transmitted from said first device to said second device after data conversion of said data converting means, wherein, said data frame of said first network having
 (b1) an area for a destination address in said first network,
 (b2) an area for a source address in said first network, and
 (b3) an area for a destination address in said second network, said data frame of said second network having
 (c1) an area for a destination address in said second network,
 (c2) an area for a source address in said second network, and
 (c3) an area for a destination address in said first network, said data converting means performing said data conversion under conditions of data in said (b1) area being equal to said (a1) address, data in said (b2) area being equal to an address of said first device in said first network, and data in said (b3) area being equal to an address of said second device in said second network, said data conversion being carried out by substituting address data in said (b3) area and said (a2) address into said (c1) area and said (c2) area, respectively, and wherein said mutual connecting apparatus is capable of connecting a plurality of the first devices and a plurality of the second devices therethrough.

6. A mutual connecting apparatus according to claim 5, wherein said first protocol is a mini manufacturing automation protocol, said second protocol is a protocol of a mechatronics network, and said first device identifies said second network uniquely by designating a media access control address of said mutual connecting apparatus as a destination address of a data frame of said mini manufacturing automation protocol.

7. A mutual connecting apparatus according to claim 5, wherein said first protocol is a protocol of a mechatronics network, said second protocol is a mini manufacturing automation protocol, and said first device identifies said second network uniquely by designating a station address of said mutual connecting apparatus as a destination address of a data frame of said mechatronics network.

8. A mutual connecting apparatus according to claim 5, wherein said first protocol is a mini manufacturing automation protocol, said second protocol is a protocol of a mechatronics network, and said first device identifies said second device uniquely by designating a station address assigned to said second device as a destination service access point address in a data frame of said mini manufacturing automation protocol.

9. A mutual connecting apparatus according to claim 5, wherein said first protocol is a mini manufacturing automation protocol, said second protocol is a protocol of a mechatronics network, and said data converting means converts a data frame of said mini manufacturing automation protocol into a data frame of said mechatronics network by substituting a media access control address and a local service access point address of said data frame of said mini manufacturing automation protocol into a region arranged for option commands of said data frame of said mechatronics network.

10. A mutual connecting apparatus according to claim 5, wherein said first protocol is a mini manufacturing automation protocol, said second protocol is a protocol of a mechatronics network, and said data converting means converts a data frame of said mini manufacturing automation protocol into a data frame of said mechatronics network by substituting a destination service access point address of said data frame of said mini manufacturing automation protocol, a station address of said mutual connecting apparatus, a source address and a source service access point address of said data frame of said mini manufacturing automation protocol into a destination address and a source address of said data frame of said mechatronics network, a media access control address and local service access point address of a region arranged for option commands of said data frame of said mechatronics network, respectively.

11. A mutual connecting apparatus according to claim 5, wherein said first protocol is a protocol of a mechatronics network, said second protocol is a mini manufacturing automation protocol, and said data converting means converts a data frame of said mechatronics network into a data frame of said mini manufacturing automation protocol by substituting a media access control address of a region arranged for option commands of said data frame of said mechatronics network, a media access control address of said mutual connecting apparatus, a local service access point address of said region arranged for said option commands and a source address of said data frame of said mechatronics network into a destination address, a source address, a destination service access point address and a source service access point address of said data frame of said mini manufacturing automation protocol, respectively.

12. A mutual connecting apparatus according to claim 5, wherein said first protocol is a mini manufacturing automation protocol, said second protocol is a protocol of a mechatronics network, and said data converting means converts a data frame of said mini manufacturing automation protocol into a data frame of said mechatronics network by substituting a destination service access point address of said data frame of said mini manufacturing automation protocol and a station address of said mutual connecting apparatus into a destination address and a source address of said data frame of said mechatronics network, an storing a source address, a source service access point address and said destination service access point address of said data frame of said mini manufacturing automation protocol in a conversion table being provided with said data converting means as a media access control address, a local service access point address and a station address, respectively.

13. A mutual connecting apparatus according to claim 5, wherein said data frame of said first network has said areas (b1) and (b2), and said apparatus has an internal table for relating said destination address in said second network with at least one of said destination address and said source address in said first network.

14. A mutual connecting apparatus according to claim 13, wherein said data frame of said second network has said areas (c1) and (c2), and said apparatus has an internal table for relating said destination address in said first network with at least one of said destination address and said source address in said second network.

15. A mutual connecting apparatus according to claim 13, wherein said data converting means converts said data frame of said mechatronics network into said data frame of said mini manufacturing automation protocol by substituting said media access control address in said internal table, a media access control address of said mutual connecting apparatus, said local service access point address in said internal table and said source address of said data frame of said mechatronics network into said destination address, said source address, said destination service access point address and said source service access point address of said data frame of said mini manufacturing automation protocol, respectively.

* * * * *

UNITED STATES PATENT AND TRADEMARK OFFICE
CERTIFICATE OF CORRECTION

PATENT NO. : 5,640,400
DATED : Jun. 17, 1997
INVENTOR(S) : Ryoichi Sato, et al

It is certified that error appears in the above-identified patent and that said Letters Patent is hereby corrected as shown below:

On title page, item [73] should read:

Assignee: Sharp Kabushiki Kaisha, Osaka 545 JAPAN and
Toyota Jidosha Kabushiki Kaisha Signed and Sealed this Twenty-fourth Day of February, 1998

*Attest:*

BRUCE LEHMAN

*Attesting Officer*     *Commissioner of Patents and Trademarks*